US011675936B2

(12) United States Patent
McGregor et al.

(10) Patent No.: US 11,675,936 B2
(45) Date of Patent: Jun. 13, 2023

(54) UNIFYING MULTIPLE SIMULATION MODELS

(71) Applicant: Rockwell Automation Technologies, Inc., Mayfield Heights, OH (US)

(72) Inventors: Ian McGregor, Shepperton (GB); Adam Davidson, Reading (GB); David Dawkins, Reading (GB)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 17/034,688

(22) Filed: Sep. 28, 2020

(65) Prior Publication Data

US 2022/0100917 A1    Mar. 31, 2022

(51) Int. Cl.
*G06G 7/48* (2006.01)
*G06F 30/12* (2020.01)
(Continued)

(52) U.S. Cl.
CPC ............ *G06F 30/12* (2020.01); *G06T 13/20* (2013.01); *G06F 2111/02* (2020.01); *G06F 2111/20* (2020.01)

(58) Field of Classification Search
CPC .. G06F 30/12; G06F 2111/20; G06F 2111/02; G06T 13/20
See application file for complete search history.

(56) References Cited

U.S. PATENT DOCUMENTS 9,989,958 B2   6/2018 Asenjo et al.
10,318,904 B2* 6/2019 Johnson ............... G06Q 10/087
(Continued)

FOREIGN PATENT DOCUMENTS

EP    2 871 540 A2   5/2015
EP    3 318 944 A2   5/2018
(Continued)

OTHER PUBLICATIONS

Anagnostou, Anastasia, and Simon JE Taylor. "A distributed simulation methodological framework for OR/MS applications." Simulation Modelling Practice and Theory 70 (2017): 101-119.*
(Continued)

*Primary Examiner* — Rehana Perveen
*Assistant Examiner* — Nithya J. Moll
(74) *Attorney, Agent, or Firm* — Amin, Turocy & Watson, LLP

(57) ABSTRACT

A design and testing simulation scales an industrial simulation across multiple different processing nodes, and generates a unified view of the distributed industrial simulation based on simulation and graphics data collected from the multiple processing nodes. The system can allow the user to designate different portions of the a digital model of an automation system to be executed on respective different distributed processing nodes, such that each portion of the model is executed on its designated node and the nodes exchange data as necessary to simulate the aggregate automation system as a whole. In order to visualize this aggregated simulation, the design and testing system unifies the distributed portions of the model into a unified three-dimensional presentation at a single node, and this unified view is animated based on data received from the nodes on which the distributed simulation is executed.

20 Claims, 21 Drawing Sheets

(51) Int. Cl.
    *G06T 13/20*     (2011.01)
    *G06F 111/02*     (2020.01)
    *G06F 111/20*     (2020.01)

(56) References Cited

U.S. PATENT DOCUMENTS

| | | | |
|---|---|---|---|
| 10,596,704 | B1 | 3/2020 | Ramanujam et al. |
| 10,678,233 | B2* | 6/2020 | Celia ............... H04L 1/0002 |
| 10,996,642 | B2* | 5/2021 | Wang ............... G06F 16/285 |
| 11,080,435 | B2* | 8/2021 | Bourhani ............ G06F 8/34 |
| 2009/0089030 | A1 | 4/2009 | Sturrock et al. |
| 2009/0089031 | A1 | 4/2009 | Sturrock et al. |
| 2009/0319058 | A1 | 12/2009 | Rovaglio et al. |
| 2013/0204587 | A1 | 8/2013 | Cheng et al. |
| 2013/0275091 | A1 | 10/2013 | Peterson et al. |
| 2014/0180644 | A1 | 6/2014 | Maturana et al. |
| 2015/0134313 | A1 | 5/2015 | Maturana et al. |
| 2015/0161821 | A1 | 6/2015 | Mazula |
| 2015/0277406 | A1 | 10/2015 | Maturana et al. |
| 2016/0182309 | A1 | 6/2016 | Maturana et al. |
| 2017/0025040 | A1 | 1/2017 | Maturana et al. |
| 2017/0053047 | A1 | 2/2017 | Mcdaniel |
| 2017/0249129 | A1 | 8/2017 | Mcdaniel |
| 2018/0131907 | A1 | 5/2018 | Schmirler et al. |
| 2019/0221037 | A1 | 7/2019 | Sugaya |
| 2020/0012265 | A1 | 1/2020 | Thomsen et al. |
| 2020/0034501 | A1 | 1/2020 | Duff et al. |
| 2020/0142388 | A1 | 5/2020 | Maggiore et al. |

FOREIGN PATENT DOCUMENTS

| | | |
|---|---|---|
| EP | 3 798 775 A1 | 3/2021 |
| WO | 2016/053337 A1 | 4/2016 |

OTHER PUBLICATIONS

Ge, Zhiqiang, and Junghui Chen. "Plant-wide industrial process monitoring: A distributed modeling framework." IEEE Transactions on Industrial Informatics 12.1 (2015): 310-321.*

Swets, Roderick J., and Glenn R. Drake. "The Arena product family: enterprise modeling solutions." Proceeding of the 2001 Winter Simulation Conference (Cat. No. 01CH37304). vol. 1. IEEE, 2001.*

Non-Final Office Action received for U.S. Appl. No. 16/679,522 dated Jun. 9, 2021, 107 pages.

Beier, Klaus peter "Web-Based Virtual Reality in Design and Manufacturing Applications". 1st International EuroConference on Computer Applications and Information Technology in the Maritime Industries, 2000 11 Pages.

Extended European Search Report received for European Patent Application Serial No. 20204067.1 dated Mar. 24, 2021, 09 pages.

Dahmen et al., "Experimentable Digital Twins for a Modeling and Simulation-based Engineering Approach", IEEE International Systems, XP033456884, DOI: 10.1109/SYSENG.2018.8544383, Oct. 1, 2018, 08 pages.

Extended European Search Report received for European Patent Application Serial No. 20204528.2 dated Apr. 6, 2021, 10 pages.

Extended European Search Report received for EP Patent Application Serial No. 21156811.8 dated Jul. 15, 2021, 11 pages.

Communication Pursuant to Rule 69 EPC received for EP Patent Application Serial No. 21156811.8 dated Aug. 23, 2021, 2 pages.

Non-Final Office Action received for U.S. Appl. No. 16/679,503 dated Aug. 3, 2021, 136 pages.

Negri et al., "A review of the roles of digital twin in CPS-based production systems", 27th International Conference on Flexible Automation and Intelligent Manufacturing, Procedia Manufacturing, vol. 11, Jun. 27-30, 2017, pp. 939-948.

Luo et al., "MIDAS: Multidisciplinary interactive design and analysis system-integration of ASTROS and I-DEAS", 37th Structure, Structural Dynamics and Materials Conference, 1996, 16 pages.

Dominik et al., "Towards a Digital Twin: How the Blockchain can Foster E/E-Traceability in Consideration of Model-Based Systems Engineering", DS 87-3 Proceedings of the 21st International Conference on Engineering Design, vol. 3: Product, Services and Systems Design, Aug. 21-25, 2017, pp. 321-330.

Jakob et al., "Virtual Commissioning and construction of a digital twin for Smarta Fabriker", Chalmers, 2018, 36 pages.

Warmefjord et al., "Inspection Data to Support a Digital Twin for Geometry Assurance", ASME International Mechanical Engineering Congress and Exposition, vol. 58356, Nov. 3-9, 2017, pp. 1-10.

Notice of Allowance received for U.S. Appl. No. 16/679,522 dated Dec. 22, 2021, 101 pages.

Final Office Action received for U.S. Appl. No. 16/679,503 dated Dec. 13, 2021, 59 pages.

Extended European Search Report received for EP Patent Application Serial No. 21186087.9 dated Jan. 5, 2022, 13 pages.

Communication pursuant to Rule 69 EPC received for European Patent Application Serial No. 21186087.9 dated Apr. 4, 2022, 2 pages.

Non-Final Office Action received for U.S. Appl. No. 16/679,503 dated Mar. 28, 2022, 82 pages.

Guivarch et al., "Creation of Helicopter Dynamic Systems Digital Twin Using Multibody Simulations", CIRP Annals—Manufacturing Technology, 2019, vol. 68, pp. 133-136.

Non-Final Office Action received for U.S. Appl. No. 16/791,107 dated May 25, 2022, 41 pages.

Communication pursuant to Rule 69 EPC received for European Patent Application Serial No. 21196290. 7 dated Apr. 4, 2022, 2 pages.

Final Office Action received for U.S. Appl. No. 16/679,503 dated Jul. 13, 2022, 115 pages.

Non-Final Office Action received for U.S. Appl. No. 17/726,716 dated Oct. 21, 2022, 76 pages.

Notice of Allowance received for U.S. Appl. No. 17/726,716 dated Jan. 13, 2023, 58 pages.

Communication pursuant to Article 94(3) EPC received for European Patent Application Serial No. 20204528.2 dated Jan. 4, 2023, 5 pages.

* cited by examiner

US 11,675,936 B2

UNIFYING MULTIPLE SIMULATION MODELS

BACKGROUND

The subject matter disclosed herein relates generally to industrial automation systems, and, more specifically, to digital simulations of industrial systems.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for rendering industrial simulations is provided, comprising a node interface component configured to communicatively connect to multiple processing node devices that collectively execute a distributed simulation of an industrial automation system, wherein the distributed simulation comprises multiple model portions representing respective portions of the industrial automation system, the multiple model portions are respectively simulated by the multiple processing node devices, and the node interface component is further configured to collect graphical data and simulation data from the multiple processing node devices and to aggregate the graphical data and simulation data to yield unified presentation data; and a user interface component configured to render, on a client device, a unified presentation of the industrial automation system based on the unified presentation data.

Also, one or more embodiments provide a method for generating presentations of industrial simulations, comprising communicatively connecting, by a system comprising a processor, to multiple processing node devices that collectively execute a distributed simulation of an industrial automation system, wherein the distributed simulation comprises multiple model portions representing respective portions of the industrial automation system, and the multiple model portions are respectively simulated by the multiple processing node devices; collecting, by the system, graphical data and simulation data from the multiple processing node devices; aggregating, by the system, the graphical data and simulation data to yield unified presentation data; and rendering, on a client device, a unified presentation of the industrial automation system based on the unified presentation data.

Also, according to one or more embodiments, a non-transitory computer-readable medium is provided having stored thereon instructions that, in response to execution, cause a system to perform operations, the operations comprising communicatively connecting to multiple processing node devices that collectively execute a distributed simulation of an industrial automation system, wherein the distributed simulation comprises multiple model portions representing respective portions of the industrial automation system, and the multiple model portions are respectively simulated by the multiple processing node devices; collecting graphical data and simulation data from the multiple processing node devices; aggregating the graphical data and simulation data to yield unified presentation data; and rendering a unified presentation of the industrial automation system based on the unified presentation data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
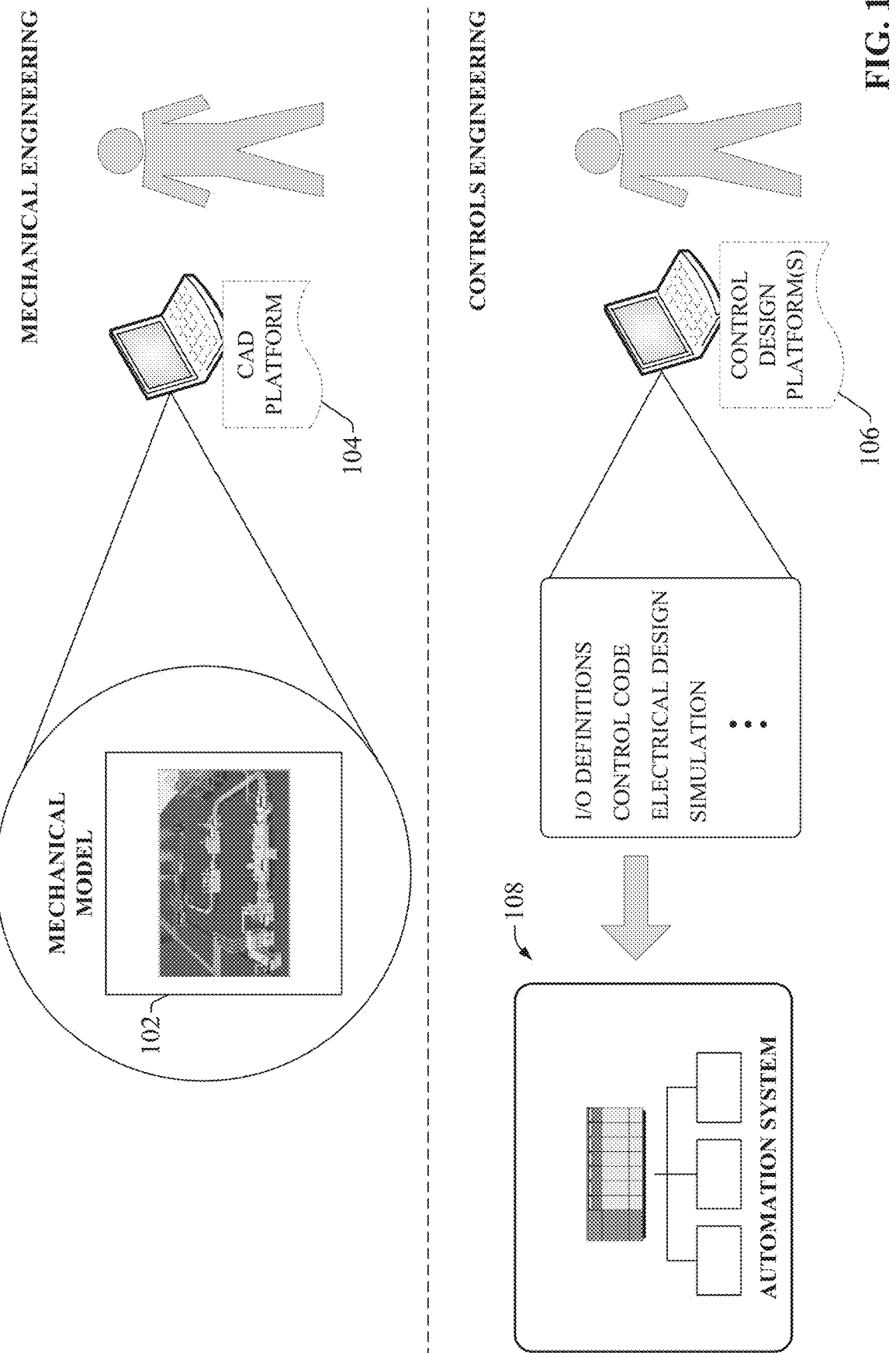
FIG. 1 is a diagram illustrating the use of separate design platforms for mechanical and controls engineering in connection with designing an industrial automation system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

At a high level, designing a new industrial automation system typically involves two separate but interrelated engineering efforts to develop the mechanical aspects on one hand and control aspects on the other. Mechanical engineering may involve selecting or designing the machines that will make up the new system (e.g., industrial robots, machining stations, conveyors, operator workstations, motion devices, motors, pneumatic actuators, etc.), determining suitable locations and orientations of these machines, selecting and locating sensors that will be used to feed status and operating data to the control devices, etc. Based on this mechanical design, controls engineers design the electrical system for both power and data connectivity, develop control code (e.g., ladder logic, sequential function charts, function block diagrams, structured text, etc.) to be executed by one or more industrial controllers to control the behavior of the automation system, set device configurations (e.g., motor drive parameter settings), and develop human-machine interfaces (HMIs) for visualizing machine statuses and alarms. As part of the development process, controls engineers may also execute digital simulations that test the control programming against a virtualization of the mechanical system (e.g., a digital twin).

Given these two engineering threads, conventional engineering workflow for designing, programming, and testing an industrial automation system typically requires the use of separate design tools for mechanical engineering and controls engineering. FIG. 1 is a diagram illustrating the use of separate design platforms for mechanical and controls engineering in connection with designing an industrial automation system. Mechanical engineers may develop the mechanical design as a digital three-dimensional (3D) mechanical model 102 in a computer-aided design (CAD) platform 104. Based on this mechanical model 102 and knowledge of the desired operating sequence, controls engineers may design the control system—including the electrical design, I/O definitions, and control programming—in one or more control design platforms 106, which may include an industrial controller programming application, an electrical drawing application, a device configuration application, an HMI development application, or other such platforms. For example, the controls engineer may reference the mechanical design in connection with determining the list of I/O points necessary to control the new automation system based on the motors, drives, actuators, safety devices, or other industrial assets present in the system, as well as to map industrial controller tags to these I/O points and to generate the control programming for carrying out the desired automation sequences.

Control design platforms 106 may also include a digital simulation platform that emulates execution of the control program against a virtual model of the automation system in order to test the control programming and the mechanical design, a process referred to as virtual commissioning. Such simulation platforms can mimic the behavior of the automation system's mechanical assets in response to execution of the control program on an emulated industrial controller so that proper operation can be verified. During commissioning of the physical system, the completed control code, device configurations, and HMI applications are downloaded to the appropriate field devices 108 of the automation system.

Since there is typically no direct link between the mechanical and control design platforms, changes made to the mechanical design on the CAD side must be communicated to the controls engineer so that the control design can be updated accordingly if necessary. Consequently, if the two engineering teams are working in parallel and revising their respective designs, maintaining synchronization between the mechanical and control designs can be difficult. Moreover, if the system design is to be tested via simulation, a virtual simulation-capable model of the automation system (e.g., a digital twin) must be developed separately from the mechanical CAD model 102 in order to test the control programming in the virtual domain prior to commissioning, since the mechanical model 102 developed on the CAD platform 104 is not simulation-capable and thus cannot be used for virtual commissioning.

To address these and other issues, one or more embodiments of the present disclosure provide an industrial CAD system, or an add-on thereto, that simplifies automation system development workflow by integrating the mechanical and control domains into the CAD platform, making CAD a common source of information for both the mechanical aspects as well as the electrical and control interface information. According to one or more embodiments, the CAD system can incorporate a set of features that allow a user to mark or label selected elements of a mechanical CAD drawing with "aspects" within the CAD environment. These aspect markups label the selected mechanical elements as being specific types of industrial assets or control elements. For example, a user may label a selected element or component of the mechanical CAD model as being a certain type of dynamic or kinematic joint (e.g., a slider joint, a robot joint, a revolute joint, a prismatic joint, a helical joint, a cylindrical joint, a planar joint, a spherical joint, etc.), a conveyor, a motor, a gripper (e.g., a mechanical gripper, a suction gripper, etc.), a mechanical load, a sensor, an actuator, or another type of industrial asset. The aspects can also define physics geometries or properties of selected elements of the mechanical design.

When selected elements of the mechanical CAD model are labeled with these aspects, the CAD platform associates simulation metadata with the selected elements based on the type of aspect with which each element is labeled. This simulation metadata defines the behavior—e.g., ranges, directions, and/or axes of motion, motion constraints, speeds, forces, etc.—of the selected element within the context of a virtual simulation, transforming the mechanical CAD model into a simulation-capable digital model (e.g., a dynamic digital twin) that can be exported to a simulation and testing platform. Within the simulation and testing platform, the resulting enhanced model can be connected to an emulated industrial controller to test control logic and to monitor simulated operation of the automation system. In this way, both mechanical and simulation markups can be added through the CAD platform to yield a usable emulation and simulation model of the automation system.

Figure 2:
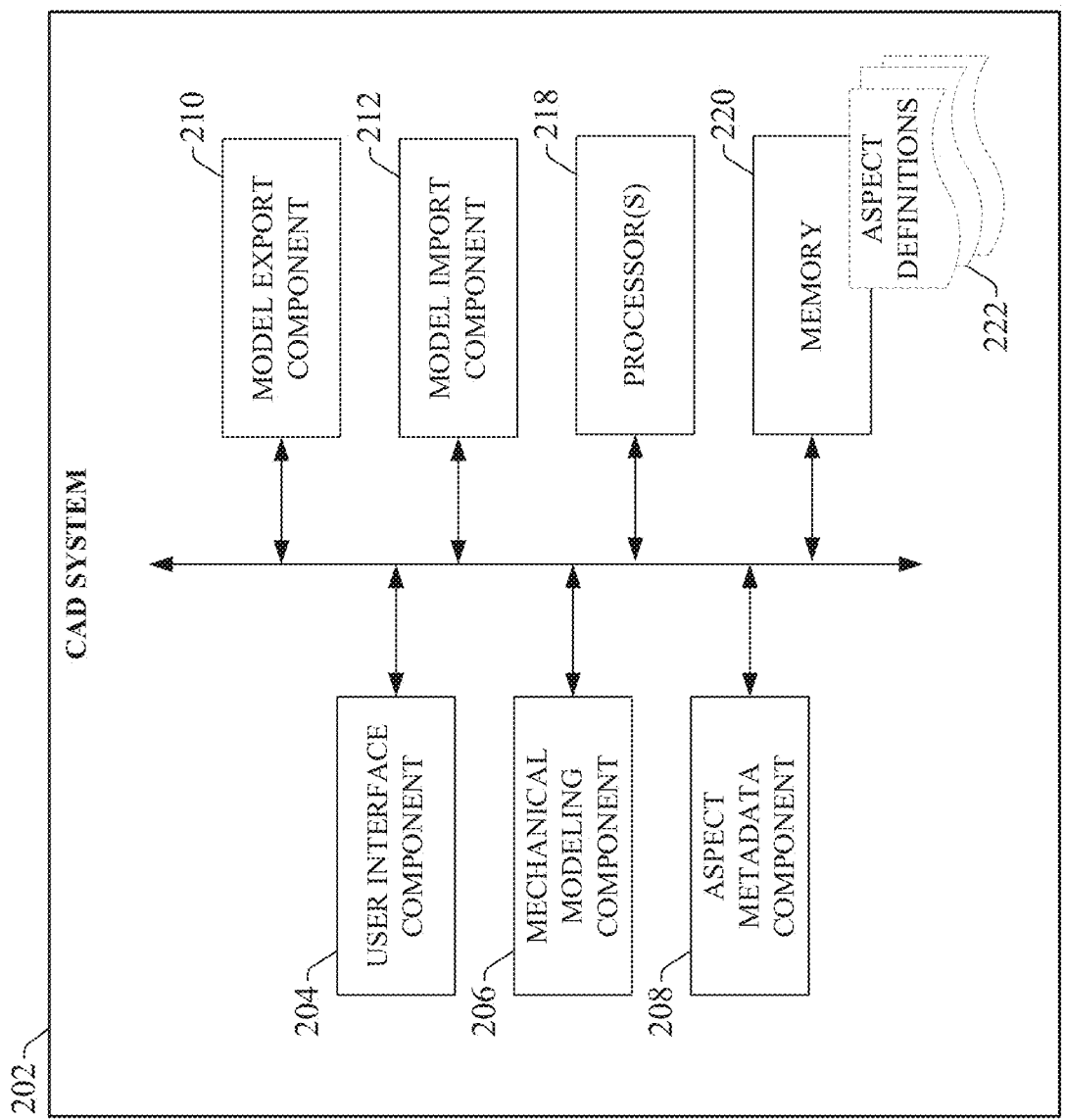
FIG. 2 is a block diagram of an example CAD system that supports labeling of a 3D mechanical CAD model with control aspects to facilitate creation of a dynamic digital twin.

FIG. 2 is a block diagram of an example CAD system 202 that supports labeling of a 3D mechanical CAD model with control aspects to facilitate creation of a dynamic digital twin according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

CAD system 202 can include a user interface component 204, a mechanical modeling component 206, an aspect metadata component 208, a model export component 210, a model import component 212, one or more processors 218, and memory 220. In various embodiments, one or more of the user interface component 204, mechanical modeling component 206, aspect metadata component 208, model export component 210, model import component 212, the one or more processors 318, and memory 320 can be electrically and/or communicatively coupled to one another to perform one or more of the functions of the CAD system 202. In some embodiments, components 204, 206, 208, 210, and 212 can comprise software instructions stored on memory 220 and executed by processor(s) 218. CAD system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to a user in any suitable format (e.g., visual, audio, tactile, etc.). In some embodiments, user interface component 204 can render interactive display screens on a display device (e.g., a display device associated with a desktop computer, a laptop computer, a tablet computer, a smart phone, etc.), where the display screens serve as the interface for a 3D mechanical design platform. The user interface component 204 can render selectable design tools and receive design input via interaction with the tools in connection with designing mechanical aspects of an industrial automation system or machine. User interface component 204 can also render a 3D graphical representation of the automation system in accordance with the design input. As will be described in more detail herein, design tools made available by the user interface component 204 include a set of automation aspects that can be selectively associated with mechanical elements or components of the automation system being designed. The aspects made available for selection are based on aspect definitions 222 maintained on the memory 220, which define the available aspects as well as associated simulation data for the respective aspects which can be used by a simulation platform to simulate operations or behaviors of the aspects within the context of an industrial simulation.

Mechanical modeling component 206 can be configured to generate a three-dimensional mechanical model of an automation system or machine based on the design input provided by a user via user interface component 204. Aspect metadata component 208 can be configured to assign aspect metadata to selected elements of the mechanical model in accordance with design input received from the user. As will be described in more detail herein, the aspect metadata labels the selected elements as being particular types of industrial components or machines (e.g., a joint of a particular type, a motor, a sensor, a conveyor, etc.), or as having a particular physics geometry or behavior. Aspect metadata assigned to a given element is drawn from one or more of the aspect definitions 222 corresponding to respective one or more aspects assigned to the element. Adding this aspect metadata to the mechanical model can yield an enhanced mechanical model (e.g., a dynamic digital twin) of the automation system that can be executed within a simulation platform to mimic the behavior of the automation system under control of an industrial control program.

The model export component 210 can be configured to export the enhanced mechanical model to an external system, such as a control design platform or a simulation platform. The model import component 212 can be configured to import the enhanced mechanical model from such external systems. In some scenarios, the enhanced mechanical model or its associated aspect metadata may have been modified by the external system. These modifications are maintained with the model and are therefore imported back into the CAD system 202 with the model, thereby maintaining synchronization between mechanical and control engineering.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
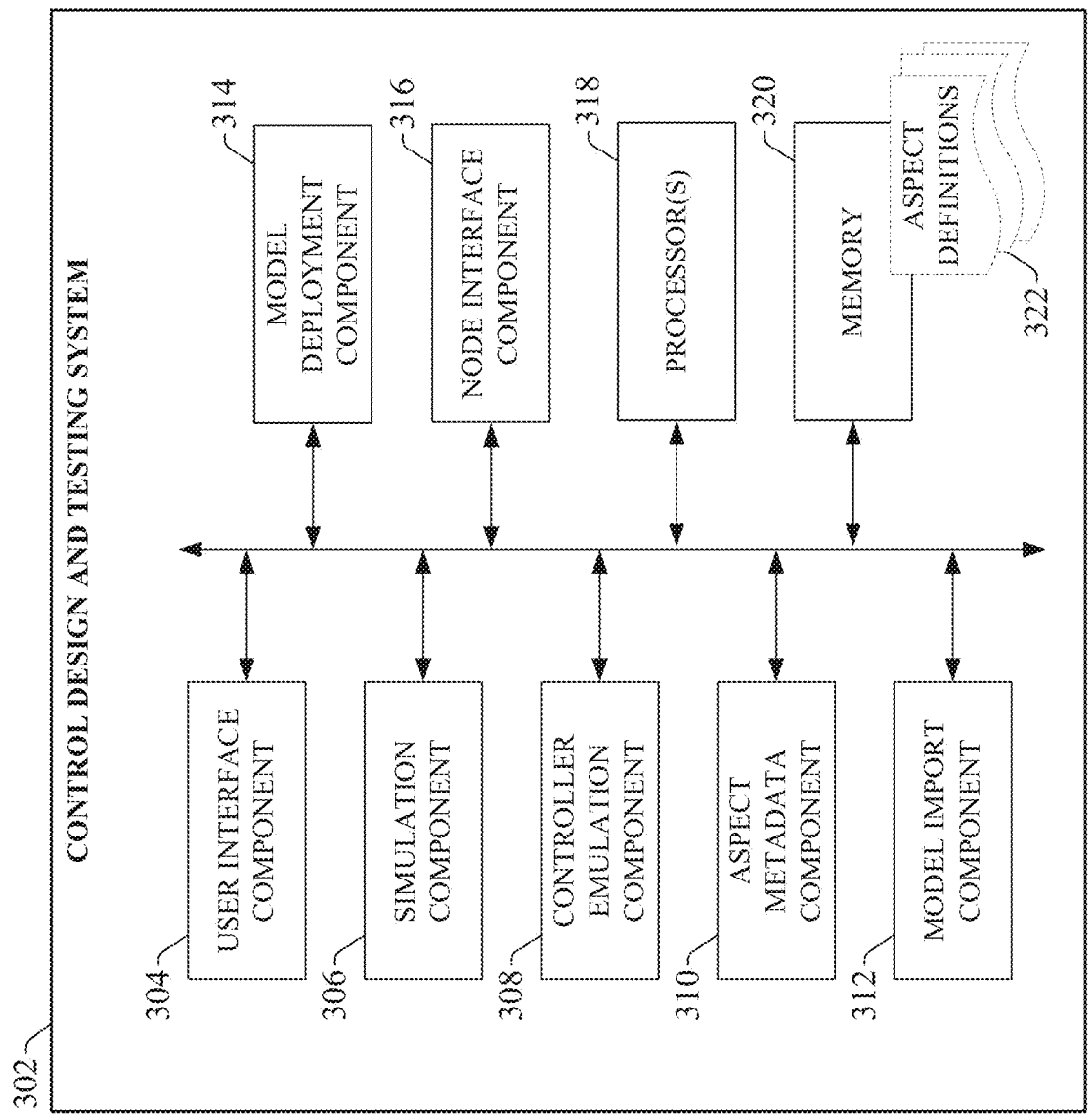
FIG. 3 is a block diagram of an example control design and testing system that also supports labeling of a 3D model of an automation system with control aspects.

FIG. 3 is a block diagram of an example control design and testing system 302 that also supports labeling of a 3D model of an automation system with control aspects. Control design and testing system 302 can include a user interface component 304, a simulation component 306, a controller emulation component 308, an aspect metadata component 310, a model import component 312, a model deployment component 314, a node interface component 316, one or more processors 318, and memory 320. In various embodiments, one or more of the user interface component 304, simulation component 306, controller emulation component 308, aspect metadata component 310, model import component 312, model deployment component 314, node interface component 316, the one or more processors 318, and memory 320 can be electrically and/or communicatively coupled to one another to perform one or more of the functions of the control design and testing system 302. In some embodiments, components 304, 306, 308, 310, 312, 314, and 316 can comprise software instructions stored on memory 320 and executed by processor(s) 318. Control design and testing system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

User interface component 304 can be configured to receive user input and to render output to a user in any suitable format (e.g., visual, audio, tactile, etc.). In some embodiments, user interface component 304 can render interactive display screens on a display device (e.g., a display device associated with a desktop computer, a laptop computer, a tablet computer, a smart phone, etc.), where the display screens serve as the interface for a control design and/or simulation platform. The user interface can display virtual 3D simulations of automation systems being tested against an emulated industrial control program, render operational statistics representing expected performance of the automation system based on the simulation, and other such information. In some embodiments, the user interface component 304 can also render selectable design tools and receive design input via interaction with the tools in connection with configuring aspects for the industrial automation (e.g., I/O connectivity between devices of the virtual system and an industrial controller). Similar to the CAD system 202 described above, design tools made available by the user interface component 304 can include a set of automation aspects that can be selectively associated with mechanical elements or components of the automation system being designed. The aspects made available for selection are based on aspect definitions 322 maintained on the memory 320, which define the available aspects as well as associated simulation data for the respective aspects which can be used by a simulation platform to simulate operations or behaviors of the aspects within the context of an industrial simulation.

Simulation component 306 can be configured to simulate operation of a virtualized model of an industrial automation system under control of an industrial control program. Controller emulation component 308 can be configured to emulate execution of an industrial control program being testing on a virtualized (or emulated) industrial controller.

Aspect metadata component 310 can be configured to assign aspect metadata to selected elements of the digital model of the automation system in accordance with design input received from the user (similar to aspect metadata component 208 of CAD system 202). The aspect metadata component 310 can also receive node designation input that designates portions of the digital model to be executed on respective different processing node devices. Model import component 212 can be configured to import a mechanical CAD model of an automation system, or another type of digital model of the system.

Model deployment component 314 can be configured to divide the digital model into portions in accordance with the node designation input and to deploy the model portions to respective different processing node devices to facilitate distributed simulation of the model. The node interface component 316 can be configured to aggregate graphics and simulation data from the distributed processing node devices into a unified three-dimensional presentation of the simulation.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
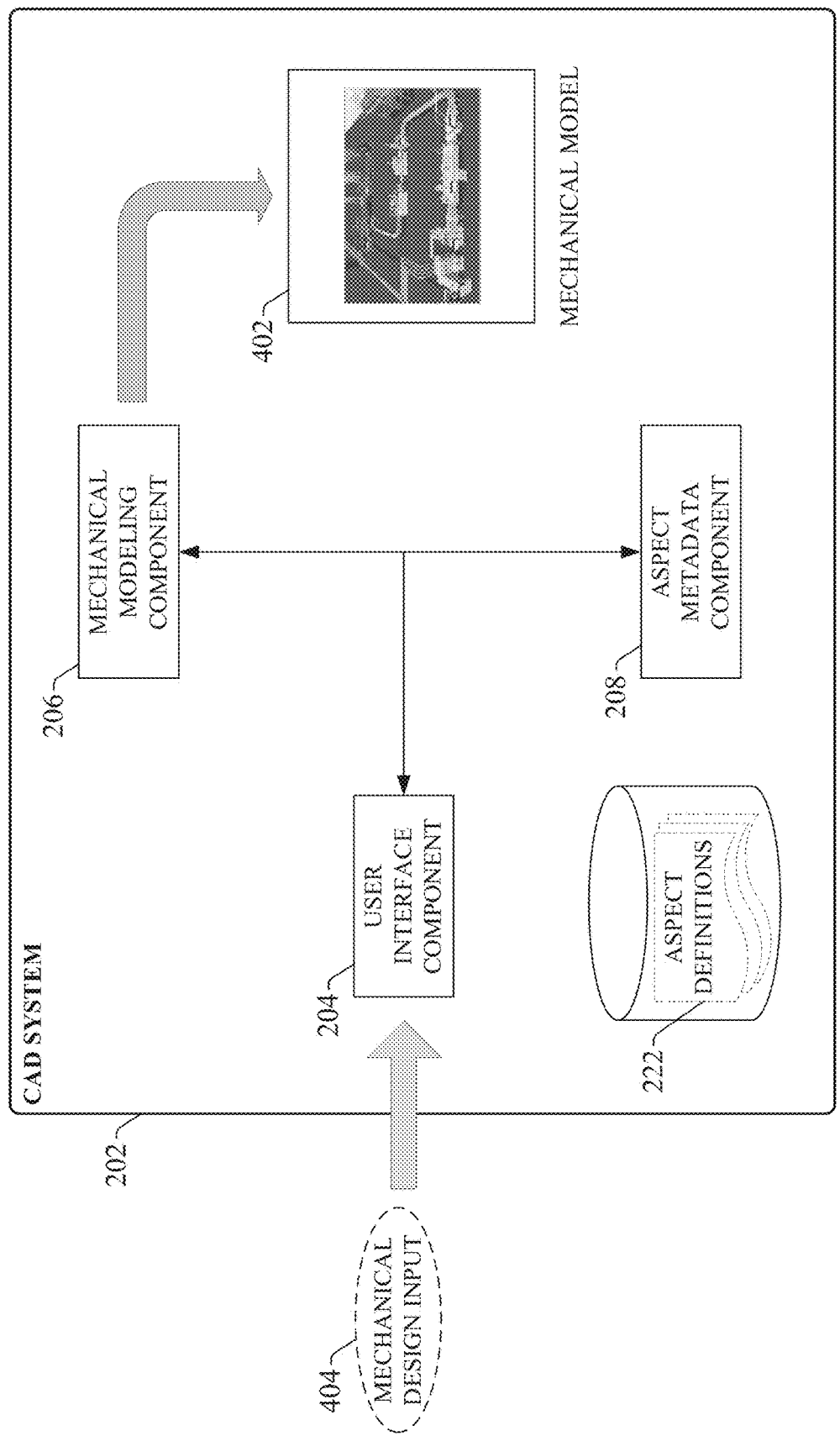
FIG. 4 is a diagram illustrating creation of a mechanical model of an industrial automation system using a CAD system.

FIG. 4 is a diagram illustrating creation of a mechanical model of an industrial automation system using CAD system 202. In some embodiments, CAD system 202 may execute on a client device, such as a desktop computer, a laptop computer, a tablet computer, a mobile device, a wearable AR/VR appliance, etc. In other embodiments, CAD system 202 may execute on a cloud platform or another high-level platform accessible to multiple users having authorization to access the system 202. In such embodiments, a client device can remotely access the CAD system's design tools and leverage these tools to develop a mechanical model of an automation system being designed.

User interface component 204 can render graphical interface displays via the client device's display hardware. Through interaction with these interface displays, the user can submit mechanical design input 404 specifying mechanical aspects of the automation system being designed. For example, mechanical design input 404 can specify three-dimensional shapes representing mechanical structures or devices to be included in the mechanical design. These shapes can graphically represent such industrial assets as industrial robots, conveyors, tooling machines, motors, motor drives, sensors, piping, conduit, platforms, safety gates and fences, control cabinets, or other such assets. The mechanical design input 404 can also specify the locations and orientations of these graphical representations relative to one another, physical connections between the mechanical elements, or other such mechanical properties and relationships. Mechanical modeling component 206 generates a 3D mechanical model 402 of the automation system (e.g., a machine assembly, a production line, etc.) in accordance with the graphical representations and their relationships defined by the mechanical design input 404.

Mechanical design input 404 can be submitted via user interface component 204 in any suitable format according to various embodiments. For example, the graphical interface displays rendered by user interface component 204 can comprise a workspace or canvas on which the mechanical model 402 is rendered, as well as associated toolbars from which the user can select 2D or 3D drawing tools or pre-defined shapes or components for inclusion in the model 402. In some embodiments, shapes representing mechanical components can be dragged into the main workspace from the toolbar, or otherwise added to the workspace for placement and orientation within the model 402. Shapes or collections of shapes within the workspace can be manipulated via interaction with the graphical interface. For example, a designer can interact with selected shapes, collections of shapes, or the model 402 as a whole to rotate, link, or relocate shapes within virtual three-dimensional space. Additions or modifications to the mechanical model 402 are stored within a CAD file representing the model 402 (e.g., a part or assembly file).

The resulting mechanical model 402 encodes the mechanical layout of the automation system being designed. However, at this stage the mechanical model 402 is essentially only a three-dimensional technical drawing suitable for use as a guide for building and installing the automation system. Controls engineers responsible for designing the electrical and control system for the automation system may also reference this model 402 in connection with developing a list of controller I/O required to monitor and control the new system, designing the power distribution wiring for providing power to the system, and generating control programming Conventionally, if the controls engineer wishes to test the control programming by simulating operation of the automation system under control of the program within the context of an emulation system, a simulation-capable digital model (e.g., a digital twin) of the automation system must be separately developed and linked to an emulated controller executing the control program.

Figure 5:
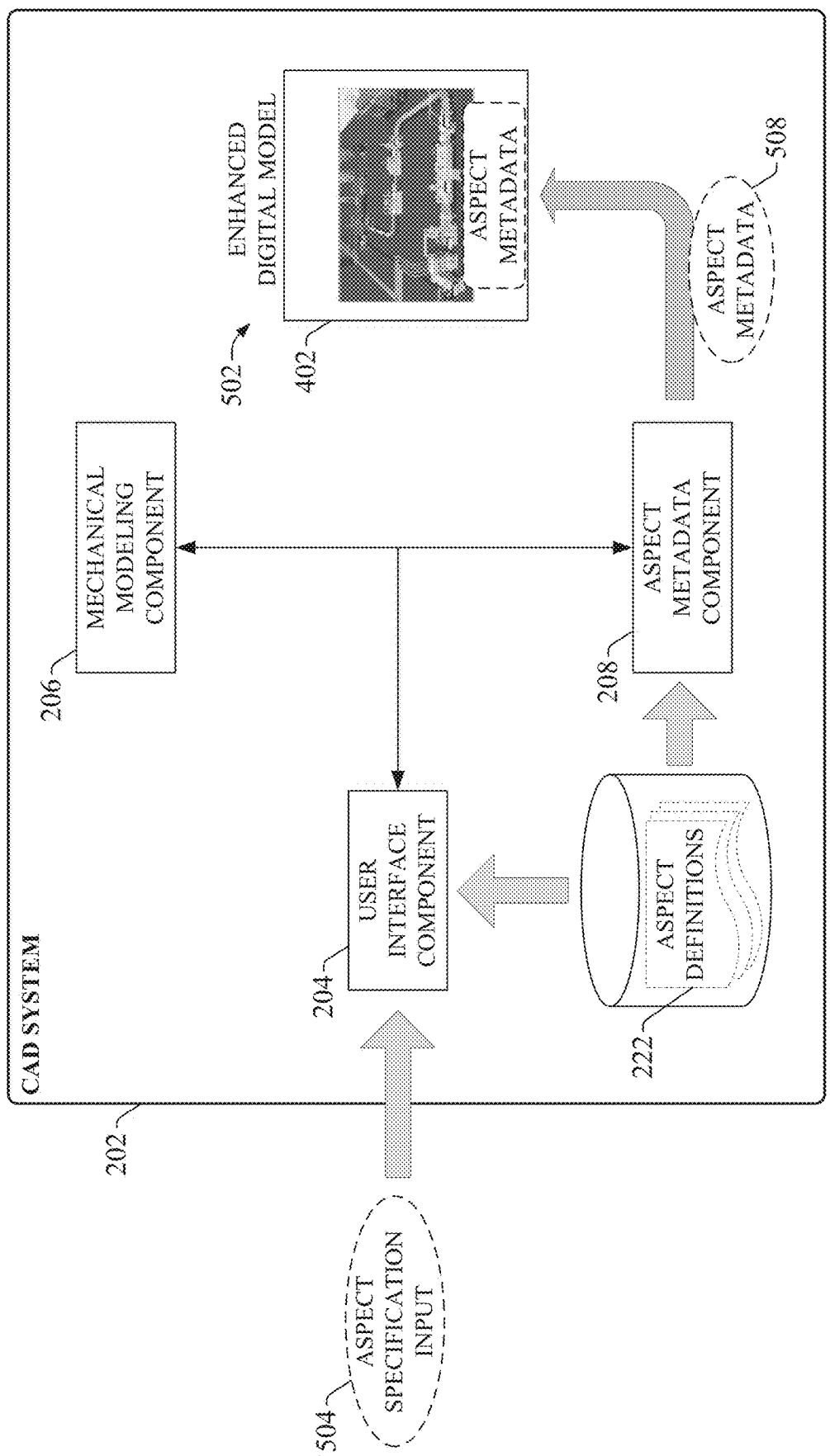
FIG. 5 is a diagram illustrating addition of aspect metadata to a mechanical model to yield an enhanced digital model of an automation system.

In order to simplify this workflow and generate a digital twin of the automation system more quickly, embodiments of CAD system 202 allow the user to enhance the completed mechanical model 402 with aspect metadata that transforms the mechanical model 402 to a simulation-capable digital model of the automation system that can be executed within a simulation platform to mimic operation of the system. FIG. 5 is a diagram illustrating the addition of aspect metadata 508 to the mechanical model 402 to yield an enhanced digital model 502 of the automation system. In one or more embodiments, the graphical interface displays rendered by user interface component 204 can include one or more toolbars for adding aspect metadata to selected elements or components of the mechanical model 402. The aspects made available for selection are based on the aspect definitions 222 stored on the CAD system 202 (e.g., on memory 220).

Each aspect definition 222 defines a set of physical, kinematic, or mechatronic properties that dictate how that aspect behaves within a simulation environment. The properties defined by an aspect definition 222 substantially mirror physical behaviors and characteristics of the corresponding physical aspect in the real world. CAD system 202 classifies the aspect definitions 222 according to the type of mechanical element, control element, or device for which the physical properties are defined. The aspect toolbar rendered by the user interface component 204 lists the available aspects according to these classifications for selection by the user. Example aspects that can be selected and applied to the mechanical model 402 include, but are not limited to, various types of dynamic or kinematic joints (e.g., slider joints, revolute joints, robot arm joints, hinges, etc.), movement surfaces such as conveyors, motors, grippers (e.g., suction grippers, mechanical grippers, etc.), sensors, pneumatic or hydraulic actuators (e.g., pusher arms, stoppers, etc.), rollers, or other such elements of the mechanical system.

The catalog of aspect definitions 222 can also include various types of robotic end effectors (e.g., mechanical grippers, suction grippers, etc.). End effector aspect definitions 222 can define physical properties (e.g., 3D physics constraints) for their corresponding gripper types, which can be used on the control simulation side to more accurately mimic operation of a robot's part handling behavior at a low level of abstraction. For example, a suction gripper aspect applied to a representation of a robot defined in the mechanical model 402 may indicate to a simulation platform that the robot's end effector is to be modeled as a suction gripper, whereby products in proximity of the suction gripper can be assumed to have been gripped by the robot (via suction), and can subsequently be moved in tandem with the robot arm to simulate movement of the part by the robot. By contrast, a mechanical gripper aspect may imply more complicated physics involved with movement of a part by the gripper. In the case of a mechanical gripper aspect, constraints of a physics engine may be used to determine whether the sides of the gripper are touching respective sides of a product at a proper location and angle before allowing the part to move in tandem with movement of the robot (due to friction between the gripper arms and the product surfaces).

Some aspect definitions 222 may also define physics geometries or properties that can be associated with selected elements of the mechanical model 402. Aspects can also designate selected machines defined within the mechanical model 402 as being load creators that introduce products having a designated shape and physical behavior (e.g., collision physics) into the automation system; e.g., via a conveyor that feeds the system.

The process of adding aspect metadata 508 to the mechanical model 402 involves labeling selected mechanical components or devices represented by the mechanical model 402 as being one of the available control aspects (represented by one of the aspect definitions 222). This aspect labeling workflow can be performed by submitting aspect specification input 504 via interaction with the graphical interface displays rendered by user interface component 204. For example, a user may select, as an aspect, a type of robot joint from the aspect toolbar and subsequently select an element of the mechanical model 402 to be labeled as this type of joint. In response to these selections, aspect metadata component 208 associates the aspect metadata 508 for the selected type of robot joint with the indicated component of the mechanical model 402, thereby transforming the static mechanical representation of the joint to an active virtual control element whose behavior can be virtually simulated within a simulation platform. The aspect metadata 508 assigned to the selected mechanical component is drawn from the aspect definition 222 corresponding to the indicated type of aspect.

Figure 6:
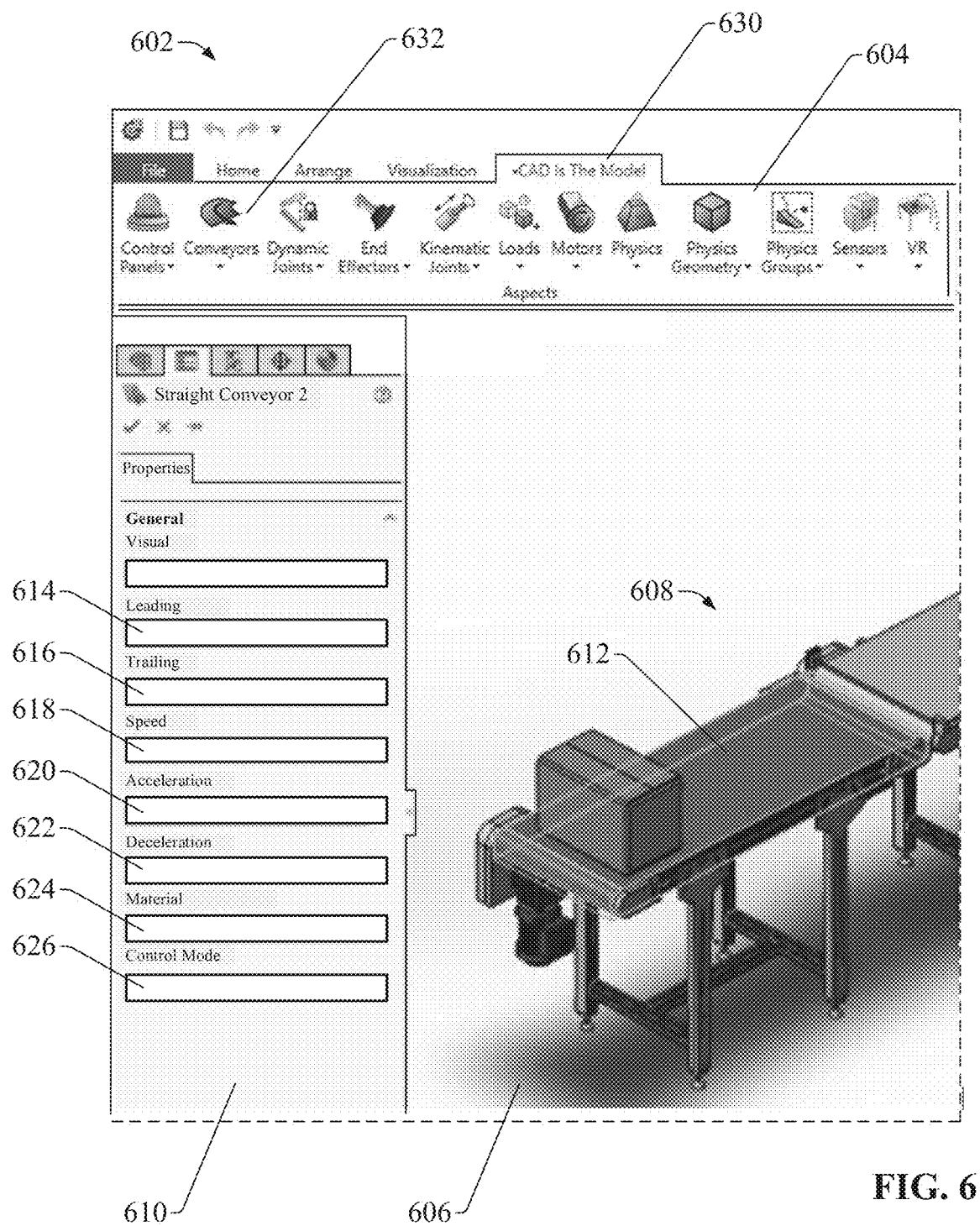
FIG. 6 is an example interface display that can be rendered by a CAD system and used to assign aspect metadata to a mechanical CAD model.

Aspect metadata 508 can define substantially any type of information that can be recognized and leveraged by a simulation platform to accurately model the runtime movement or behavior of the corresponding mechanical component in response to control inputs or simulated forces. Depending on the aspect, the aspect metadata 508 may comprise default fixed values or properties that are globally applicable to all instances of that aspect, as well as user-defined metadata that can be customized by the user to conform to the specifics of the user's system. FIG. 6 is an example interface display 602 that can be rendered by the user interface component 204 and used to assign aspect metadata 508 to a mechanical CAD model 402. In this example, interface display 602 comprises a main workspace 606 on which is rendered a 3D CAD representation 608 of the mechanical model 402 of an automation system being designed. Interface display 602 can render an aspect toolbar 604 above the main workspace 606 in response to selection of a control aspect tab 630. Aspect toolbar 604 displays a number of selectable options representing control aspects—or categories of aspects—that can be selected and added to the model via interaction with the CAD representation 608 (e.g., control panels, conveyors, dynamic joints, end effectors, kinematic joints, loads, motors, physics, physics geometry, physics groups, sensors, etc.).

In the example depicted in FIG. 6, a portion of the CAD representation 608 representing a conveyor 612 is to be labeled as with a "straight conveyor" aspect, identifying this component of the mechanical model 402 as a conveyor and associating simulation metadata with the representation of the conveyor 612 which can be leveraged by a separate simulation platform to accurately simulate the behavior of the conveyor 612. To assign this aspect, a user can interact with the interface display 602 to select a "straight conveyor" option from the Conveyor's drop-down selection 632 in the aspect toolbar 604, then select the representation of the conveyor 612 in the CAD representation 608 (the visualization of the mechanical model 402. In response to these selections an aspect metadata panel is rendered to the left of the main workspace 606 listing a number of fields 614-628 for entering user-definable metadata values. These user-definable metadata values are in addition to the fixed, global aspect metadata values associated with the "straight conveyor" aspect, which are also associated with the conveyor 612.

In general, the list of available user-definable aspect metadata values rendered by the user interface component 204 is based on the particular aspect selected. In this way, when a user assigns an aspect to a component of the mechanical model 402, user interface component 204 prompts the user to enter values of any user-defined metadata fields that may be available for that selected aspect. In the illustrated example, user-definable aspect metadata 508 for a conveyor can include definitions for a leading edge 614 and a trailing edge 616 of the conveyor 612, which may be automatically identified by aspect metadata component 208 based on the shape of the mechanical conveyor representation to which the conveyor aspect is assigned, or may be explicitly identified by the user (e.g., by selecting the leading and trailing edges to indicate their locations). Additionally, the user interface component 204 may prompt the user to input such user-definable conveyor aspect metadata values as a running speed 618, an acceleration 620, or a deceleration 622 of the conveyor. The user may also be prompted to specify a material 624 of the belt used to convey products along the conveyor, which may impact the simulated traversal of products along the conveyor based on frictional coefficients or other physical properties of the material. A control mode 626 for the conveyor 612 may also be requested (e.g., on-off control, variable speed control, etc.).

Workflows and graphical interfaces similar to that illustrated FIG. 6 can be used to assign selected aspect metadata to other types of automation system components. According to another example, aspect metadata 508 for a pneumatic pusher arm may define a direction of linear movement of the pusher arm within the three-dimensional coordinate system of the mechanical model 402, a start position, and a range of movement. User interface component 204 may also prompt the user to provide user-defined metadata values for the velocity of the pusher's movement when actuated.

Some aspect definitions 222 (and corresponding aspect metadata 508 drawn from these definitions 222) may also define physical characteristics or constraints of selected mechanical components, and these characteristics and constraints can subsequently be referenced by a simulation platform to accurately simulate the movement and behaviors of the components. These characteristics can include, but are not limited to, gear diameters, gear ratios, coefficients of friction, inertias, motion constraints (e.g., known axes of motion of a particular type of robot and their corresponding motion constraints), or other such data. Depending on the type of aspect, some of these aspect metadata values may be user-defined, while others may be fixed global characteristics that are expected to be applicable to all instances of the aspect. Some aspect definitions 222 may also define executable scripts that can be executed by a separate simulation platform and applied to an associated element of the mechanical model 402 (e.g., an element labeled with the corresponding aspect by the user), causing the element to mimic the behavior of its corresponding physical component within the simulation environment.

Some aspect definitions 222 may also specify control I/O interfacing for their corresponding assets. For example, assigning aspect metadata 508 for a sensor (e.g., a photo-eye, a proximity switch, etc.) to a selected element of the mechanical model 402 representing a sensor can designate the selected element as a digital input device that provides a digital input value to an industrial controller in response to detection of an object within a detection range of the sensor. In this scenario, the detection range may be a user-defined aspect metadata value. In another example, aspect metadata 508 for a type of pusher arm may specify that the arm requires a digital controller output to control the advanced and retracted states of the pusher arm (e.g., ON for advanced and OFF for retracted), as well as two digital inputs to read the states of respective two proximity switches at the extreme ends of travel of the pusher arm to detect when the arm is in the fully advanced or fully retracted state. In general, aspect definitions 222 for system components having known or expected I/O interfacing to an industrial controller can define the inputs and/or outputs (analog and digital) required to monitor and/or control these system components. This I/O information can facilitate connectivity between the enhanced digital model 502 and an emulated controller when the model 502 is ready to be simulated within a simulation and testing platform.

Figure 7:
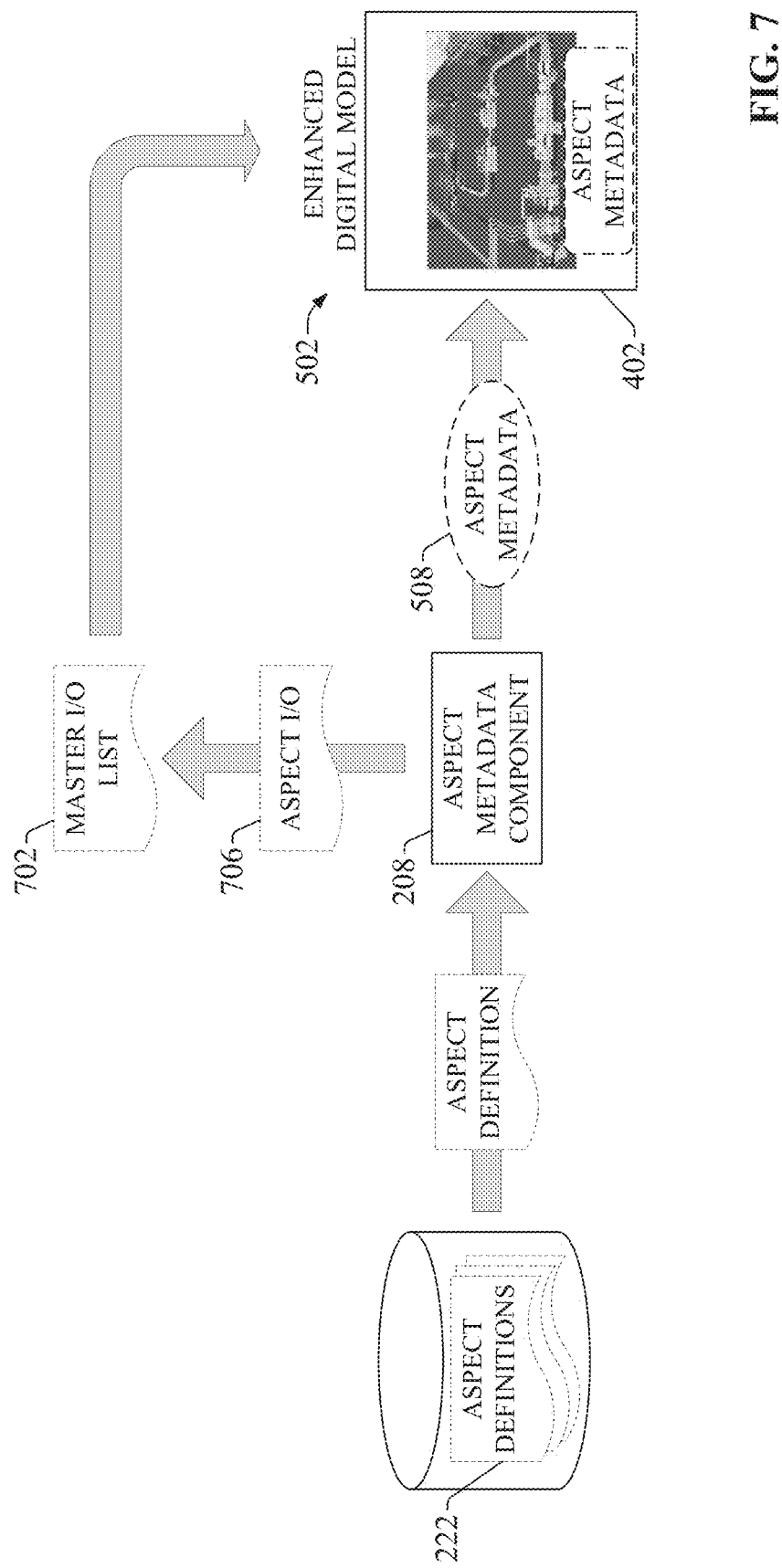
FIG. 7 is a diagram illustrating creation of a master I/O list for an automation system project based on assignment of aspect metadata to a mechanical model.

Moreover, in some embodiments, when aspects having associated I/O definitions are added to the mechanical model 402, aspect metadata component 208 can automatically populate an aggregate list of system I/O with the I/O points defined by the corresponding aspect definitions 222. FIG. 7 is a diagram illustrating creation of a master I/O list 702 for an automation system project based on assignment of aspect metadata 508 to the mechanical model 402. When an aspect is selectively assigned to an element of the mechanical model 402 as described above, the aspect metadata component 208 determines whether the aspect definition 222 corresponding to the aspect defines inputs or outputs for the aspect. In addition to assigning the aspect metadata 508 to the mechanical model 402, any aspect I/O 706 defined in the aspect definition 222 is added to a master I/O list 702 for the automation system. This master I/O list 702 can be rendered in a human-readable format and referenced by the controls engineers in connection with designing the control system and associated control logic. For example, the master I/O list 702 can populate a tag browser within a simulation platform that allows a user to selectively associate the virtual machine I/O with respective controller I/O points.

In some embodiments, the master I/O list 702 can be integrated with or otherwise stored with the enhanced digital model 502 of the automation system, such that the I/O list 702 travels with the model 502. Thus, the enhanced digital model 502 includes not only the 3D layout of the new system but also the I/O map for the entire system. This master I/O list 702 can be generated before design of the control system begins in accordance with the designated aspect metadata 508, providing controls engineers with a useful design constraint (namely, the I/O required to operate the automation system).

Some aspect metadata 508 can also designate components of the mechanical model 402 as load sources, which introduce discrete items of product (e.g., boxes, luggage, manufactured parts, fluid material, or other such product) into the system. When a load source aspect label is applied to an element of the mechanical model 402, user interface component 204 can prompt the user to provide user-defined operating parameters for the designated load source, such as a rate at which products are introduced to the system, a shape of the products (e.g., boxes or cylinders having specified dimensions, items made of a flexible material and having random variable shapes, etc.), collision physics associated with the products, or other such characteristics. When the enhanced digital model 502 is subsequently imported into a simulation platform, the simulation platform simulates release of product items by the labeled load source in accordance with the load source aspect metadata 508.

In some embodiments, functionality for labeling a 3D mechanical model 402 with aspect metadata 508 as described above can be added to an existing CAD application as a plug-in or add-on. In such embodiments, installation of the aspect metadata add-on causes a new aspect toolbar or ribbon—e.g., aspect toolbar 604 illustrated in FIG. 6—to be added to the CAD application's existing development interface and loads the aspect definitions 222 onto the CAD application. The new toolbar lists the aspects that can be used to label a mechanical model 402 developed using the CAD application's native drawing and development tools. In this way, the process of transforming a mechanical CAD model to a dynamic digital twin via aspect labeling can be easily integrated into the existing design workflow already carried out on the CAD platform. Also, although examples described above assume that the mechanical model 402 is created within the same CAD system 202 in which the model 402 is labeled with aspect metadata 508, some embodiments can import mechanical models developed in separate CAD platforms and allow the user to mark these imported mechanical models with aspect metadata 508 to facilitate creation of a dynamic digital twin.

Also, some embodiments can allow users (e.g., asset owners, original equipment manufacturers, system integrators, etc.) to extend the available aspects that can be applied to the CAD model with user-defined aspect definitions 222. Thus, in addition to the catalog of available aspect markups supported by the add-on (as defined by the aspect definitions 222), users can develop and add their own aspects—including associated simulation properties—and add these to the aspect toolbar, where the user-defined aspects can be selected and added to the mechanical CAD model 402 as aspect metadata 508. In this way, the CAD system 202 can support definition of control components that are company-specific in addition to those that are industry-specific.

Figure 8:
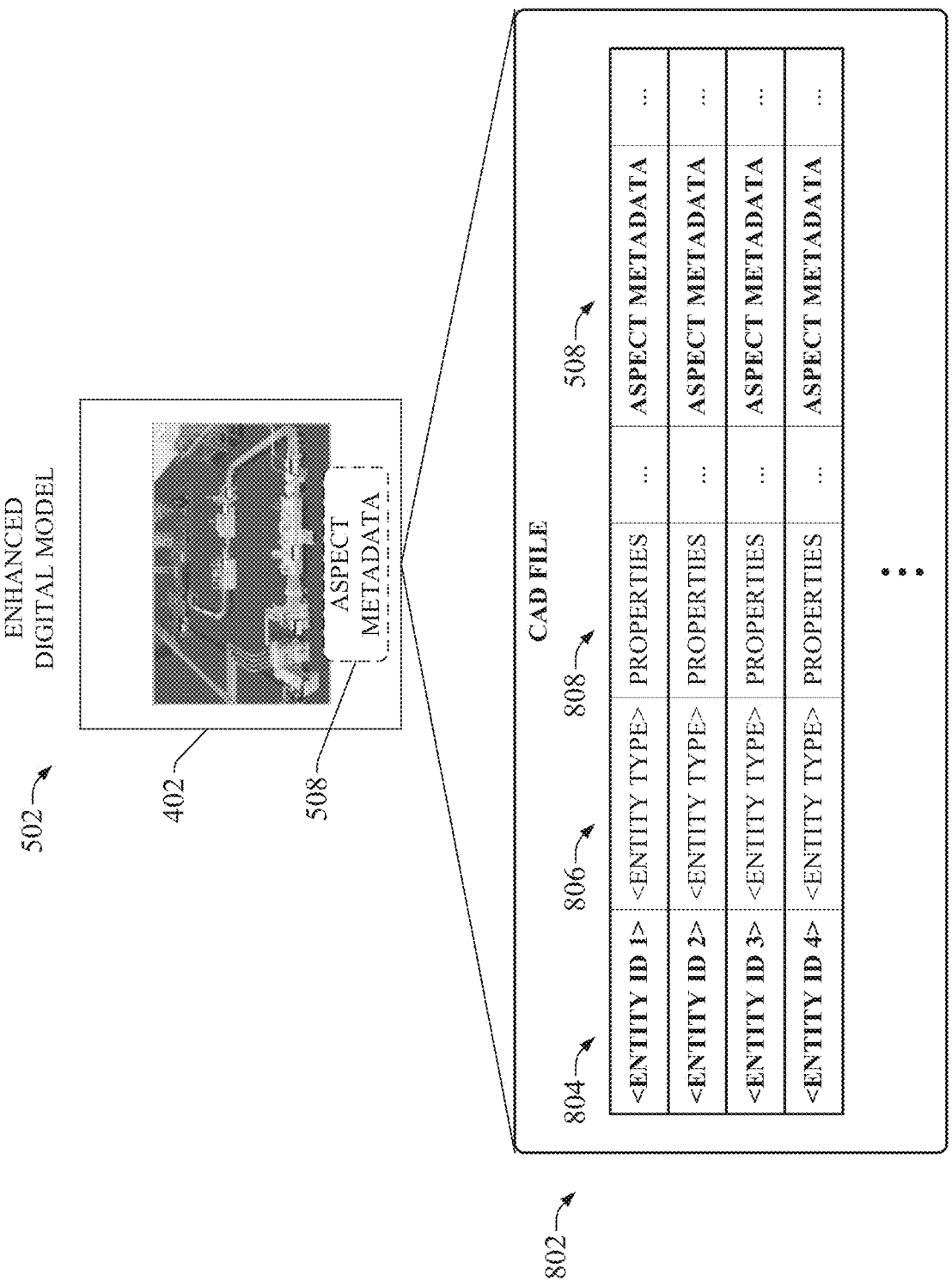
FIG. 8 is an illustration of an example CAD file that has been marked with aspect metadata.

When an element of the mechanical CAD model 402 is labeled with an aspect as described above, the aspect metadata data 406 defined by the aspect is associated with the selected element's CAD entity identifier. FIG. 8 is an illustration of an example CAD file 802 that has been marked with aspect metadata 508. In general, each element of a mechanical CAD drawing or model has an associated unique CAD entity identifier (ID) 804 with which that element's properties 808 (e.g., size, color, orientation, location, etc.) are associated. The element's type 806 (e.g., sphere, cube, line, etc.) is also defined for each entity ID 804. These entity IDs 804 are typically inherent to the existing CAD framework of a CAD platform, and the CAD file 802 for a given CAD model 402 includes the entity IDs 804 for the elements that make up the model 402.

When a user labels a selected component of the mechanical model 402 with an aspect as described above, the aspect metadata 508 for the selected aspect is added to the model's CAD file 802 in association with the selected component's entity ID 804. Since the aspect metadata 508 is tied to the CAD file's native entity IDs 804, the aspect metadata 508 is retained within the CAD file 802 itself rather than a separate file, and thus travels with the CAD file 802. In this way, the model's CAD file 802 can be imported into substantially any simulation platform as a simulation-capable enhanced digital model 502 of the automation system, and aspect metadata 508 for each entity ID 804 causes the corresponding element of the model 402 to be recognized by the simulation platform as a control or activation element.

Figure 9:
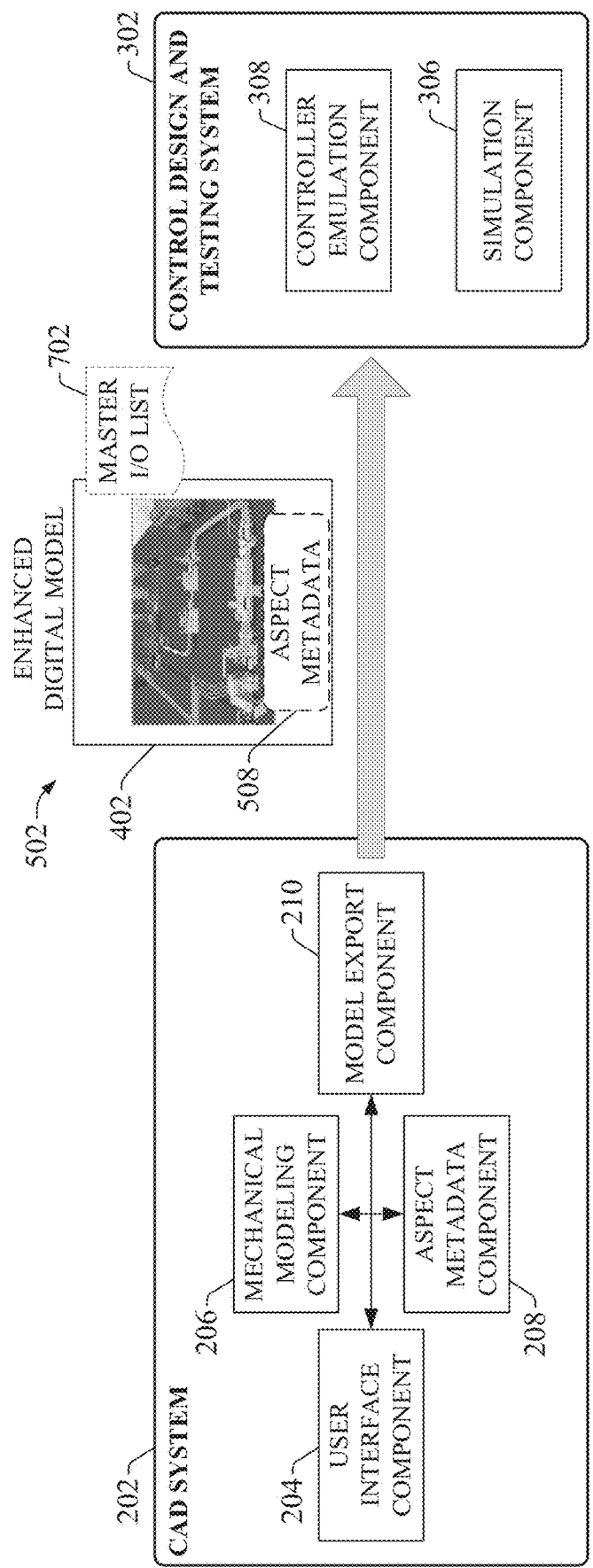
FIG. 9 is a diagram illustrating exporting of the enhanced digital model to a control design and testing platform as part of a virtual commissioning procedure.

Marking up the mechanical model 402 with aspect metadata 508 as described above yields an enhanced digital model 502 of the automation system being designed, which can be exported to a separate simulation platform for virtual commissioning. FIG. 9 is a diagram illustrating exporting of the enhanced digital model 502 to a control design and testing system 302 as part of a virtual commissioning procedure. Once the mechanical model 402 has been marked with aspect metadata 508, the resulting enhanced digital model 502 can be exported to a separate control design and testing system 302 using the CAD system's model export component 210. In an example embodiment, the CAD system's graphical interface may include a selectable Export function that, when selected, causes the model export component 210 to export the digital model—including its embedded aspect metadata and master I/O list 702—to the design and testing system 302. As an alternative to exporting the model 502 directly to the testing system 302, the model export component 210 may export the digital model 502 to a file having a format that can subsequently be imported to the testing system 302 (e.g., by the testing system's model import component 312).

Figure 10:
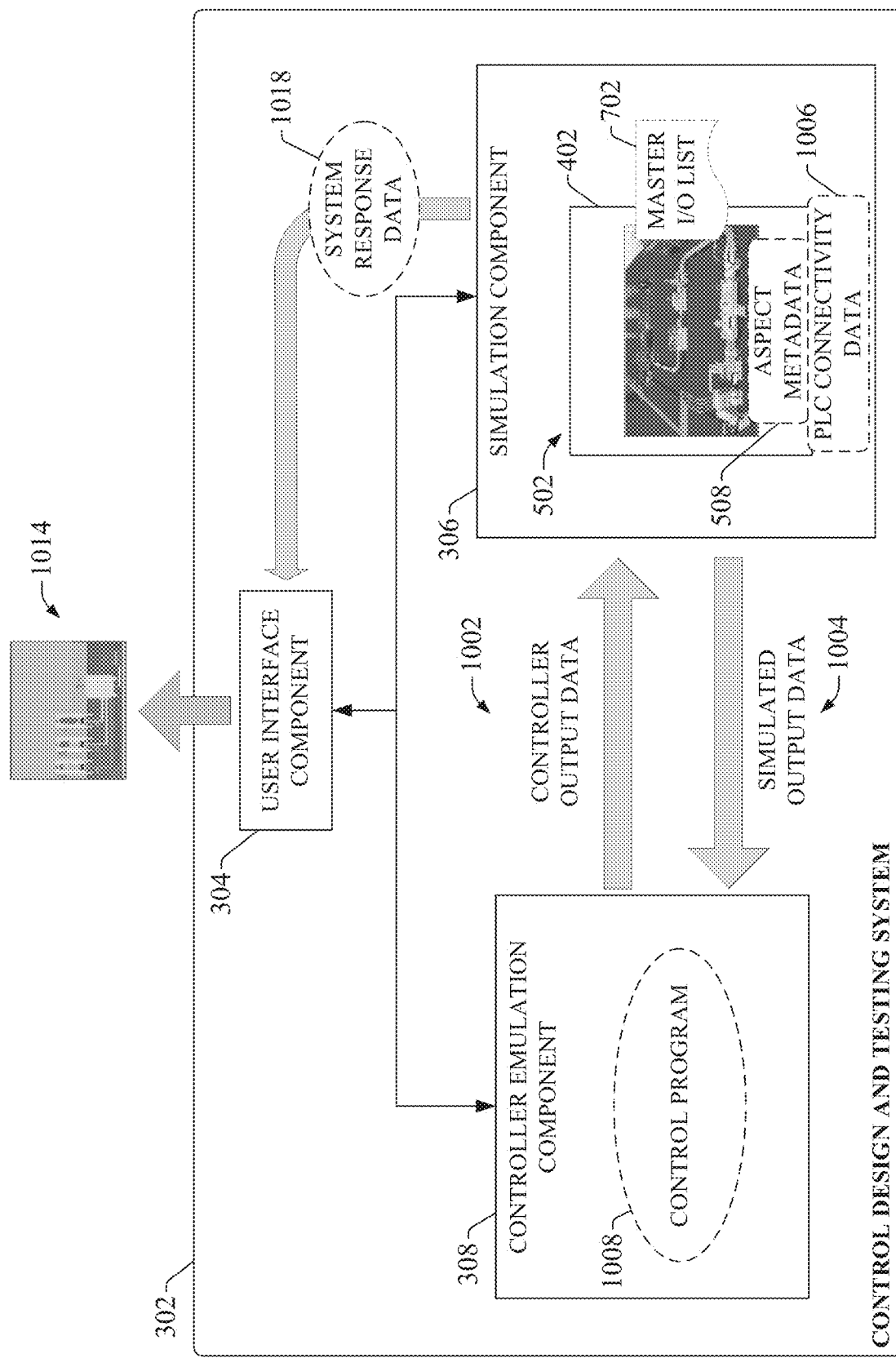
FIG. 10 is a diagram illustrating simulation of combined mechanical and control designs within a control design and testing platform using an enhanced digital model to virtually mimic the behavior of the physical automation system under control of a control program.

In the present example, control design and testing system 302 comprises a controller emulation component 308 that emulates execution of an industrial control program being testing on a virtualized (or emulated) industrial controller, and a simulation component 306 that simulates operation of a virtualized model of an industrial automation system under control of the industrial control program. Within the control design and testing system 302, the enhanced digital model 502 of the automation system—comprising the mechanical model 402 augmented with aspect metadata 508 and master I/O list 702—can be interfaced with control programming (e.g., ladder logic) being developed for the automation system to yield a virtual testing environment that allows both the mechanical and control designs to be virtually simulated and tested before finalizing the overall design and proceeding to the building and installation phase. FIG. 10 is a diagram illustrating simulation of the combined mechanical and control designs within the control design and testing system 302 using the enhanced digital model 502 to virtually mimic the behavior of the physical automation system under control of a control program 1008. The aspect metadata 508 applied to selected elements of the mechanical model 402 as described above causes those elements to be recognized by the testing platform's simulation component 306 as control or activation elements, and instructs the simulation component 306 as to how each element behaves within a simulation context in response to control and physical stimuli.

Since the enhanced digital model 502 models mechanical characteristics of the automation system as well as behavioral properties of components that make up the model (by virtue of the aspect metadata 508), the enhanced digital model 502 can be used to simulate expected operation and behavior of the automation system while under control of an emulated control program 1008. This can include viewing and verifying the simulated system's responses to control inputs in terms of movement, speeds, flows, temperatures, fill levels, movement of product through the system, etc. In the example depicted in FIG. 10, controller emulation component 308 of the testing system 302 acts as an industrial controller emulator to execute control program 1008, which is being developed and tested against the virtual model 502 of the automation system created within the CAD system 202.

Simulation component 306 can leverage the mechanical characteristics and associated aspect metadata 508 encoded in the enhanced digital model 502 to simulate operational aspects of the automation system to be monitored and regulated by the control program 1008. To achieve this, a user (e.g., a controls engineer) can virtually interface control program 1008 with the enhanced digital model 502 to facilitate exchange of simulated I/O data between the program 1008 and the digital model 502, thereby simulating real-world control and operation of the automation system. To this end, the developer can use the testing platform's configuration tools (e.g., a tag browser) to selectively map controller I/O defined by the control program 1008 to the I/O of the active control elements of the enhanced digital model 502 (that is, the control elements labeled with aspect metadata 508 designating these elements as having associated inputs and outputs available to be interfaced with an industrial controller's I/O, as documented by the master I/O list 702). In an example scenario, the controls engineer may define the PLC tags and I/O addresses that drive a motor, actuator, or other component defined in the mechanical model 402, and selectively link the tags and associated I/O addresses to the I/O points defined for the modeled component. This I/O mapping between the control program 1008 and the digital model 502, which is part of the overall automation system design, can be stored in an appropriately formatted file (e.g., a spreadsheet or another type of file) as PLC connectivity data 1006 and integrated with the digital model 502. Thus, the digital model 502 maintains this aspect of the control design in addition to the mechanical design aspects.

Control program 1008 can comprise any conceivable type of code used to process input signals read into a controller and to control output signals from the controller—including but not limited to ladder logic, sequential function charts, function block diagrams, or structured text—and is designed to regulate the automation system being modeled by digital model 502. During simulation, simulation component 306 generates digital and analog I/O values representing, for example, sensor outputs, metering outputs, or other plant data analogous to the data expected to be generated by the physical system based on the static and dynamic characteristics of the physical system represented by the digital model 502. This simulated output data 1004 is provided to the emulation component 308 executing control program 1008, which receives this data 1004 as one or more virtual physical inputs. Control program 1008 processes these inputs according to user-defined algorithms and generates digital and/or analog controller output data 1002 based on the processing. This output data 1002 represents the physical outputs that would be generated by a controller executing control program 1008 and transmitted to the hardwired field devices comprising the automation system (e.g., PID loop control outputs, solenoid energizing outputs, motor control outputs, actuator control outputs, robot control outputs, etc.). The controller output data 1002 is provided to the appropriate input points of the digital model 502 in accordance with the user-defined I/O mapping.

In addition to generating simulated output data 1004, simulation component 306 also generates system response data 1018 based on analysis of the simulated data exchange and expected behaviors of the modeled automation system in response to the simulated controller output data 1002. The simulation component 306 estimates and simulates the virtual automation system's responses to the emulated controller outputs (and the timings of these outputs) based on the behavioral and physical properties and constraints defined by the aspect metadata 508 associated with respective control elements of the mechanical model 402. For example, based on the mechanical and behavioral characteristics of the industrial components modeled in the by the enhanced digital model 502 (e.g., conveyors, industrial robots, machines, simulated products, etc.), as represented by the aspect metadata 508, simulation component 306 can predict expected behaviors of the modeled industrial components—as well as behaviors of products being manufactured, processed, or handled by the components—in response to the controller output data 1002, and convey this predicted behavior as system response data 1018. Example behaviors represented by system response data 1018 can include, but are not limited to, movements and trajectories of industrial robots, movement of product through the simulated automation system (including speeds, accelerations, locations, lags, collisions, gripper failures, etc.), flow rates of fluids through the system, expected energy consumption by the system, an expected rate of degradation of mechanical components of the system (based in part on coefficient of friction information defined in the enhanced digital model 502), expected forces applied to respective components of the system during operation, or other such behaviors.

In the case of industrial robots having end effectors that are used to grip and move items of product (e.g., to stack or palletize items of product, to move items from one conveyor to another, etc.), the simulated interactions between these robots and the products can depend in part on the type of gripper aspect metadata 508 associated with the robot's end effector. For example, as noted above, suction gripper aspect metadata 508 may indicate to the simulation component 306 that products in proximity of the suction gripper can be assumed to have been gripped by the robot provided the suction effector is properly aligned above the part, and can subsequently be moved with the robot arm to simulate movement of the part by the robot until the part is released. Alternatively, mechanical gripper aspect metadata 508 may define more involved physics to be considered by the simulation component 306 before it can be assumed that the part has been securely gripped by the robot. This may include determining whether the two arms of the gripper are touching respective sides of the product, and at the proper angles or orientations, when the effector is in the gripped position before allowing the product to move in tandem with the robot. Since secure gripping of the product by a mechanical gripper depends on proper alignment of the product upon entering the picking station from which the robot grips the part, as well as the relative alignment between the product and the robot's gripper at the time of pick-up, the simulation component 306 can assess these factors during the simulation to determine whether the product has been properly gripped, or alternatively whether a mis-grip is likely to occur due to misalignment. Instructions regarding how to properly assess this gripping behavior can be provided by the mechanical gripper aspect metadata 508 assigned to the robot.

As noted above, one or more components of the mechanical model 402 can be labeled with aspect metadata 508 designating those components as load sources. Based on this load source aspect metadata, the simulation component 306 can recognize these components of the model as load sources that introduce product (e.g., manufactured parts, boxes, bottles, fluid material, etc.) into the automation system under test, and animate these components to simulate the release of product in accordance with the metadata. Default and user-defined metadata parameters assigned to these components can define a frequency at which the product is released, a type of product (e.g., discrete solid items or liquid material), a shape of the product (e.g., boxes having specified dimensions, spherical objects, items having random amorphous shapes due to the flexible material of which the items are made, etc.), a speed at which the product traverses the system, etc. Movement of these products through the simulated automation system may also be a function of the conveyor aspect metadata associated with the conveyor representations across which the product moves (e.g., the speed of the conveyor, the material of the belt used to convey the product, etc.). The simulation component 306 can also simulate predicted collisions between items of products, or between products and machinery (e.g., collisions with a pusher arm or robot arm due to a mis-timed control sequence). Repercussions of these collisions can be predicted and simulated based on physics rules and geometries modeled in part by the aspect metadata 508. Simulation component 306 can also leverage physics rules defined by the aspect metadata 508 to determine whether a mechanical gripper has properly gripped an item of product, or is likely to drop some or all items of product due to improper gripping.

A user interface component 304 associated with the testing system 302 can generate a visualization 1014 that renders results of the simulation on a client device. Visualization 1014 can render a graphical representation of the automation system based on the enhanced digital model 502, and animate this graphical representation based on the system response data 1018 and/or other calculated statistics relating to the simulation session, yielding a three-dimensional visual presentation of the automation system in operation. Some of the simulation data can also be rendered as alphanumeric overlays on visualization 1014. This simulation technique can be used to test and debug control programs without putting field equipment and machinery at risk, to test modifications to machine operations and estimate how such modifications affect certain key performance indicators or financial metrics, or to perform other types of analytics.

In some embodiments, users can control a speed of the simulation at a high degree of granularity. For example, a user may select to execute the simulation in real-time, such the simulation depicts operation of the automation system as it would transpire in real-time. Alternatively, the user may selectively choose to execute some or all phases of a simulated control sequence or process faster than real-time, in accordance with a time base specified by the user. This causes the simulation and its associated analysis to transpire within a compressed time frame.

Figure 11:
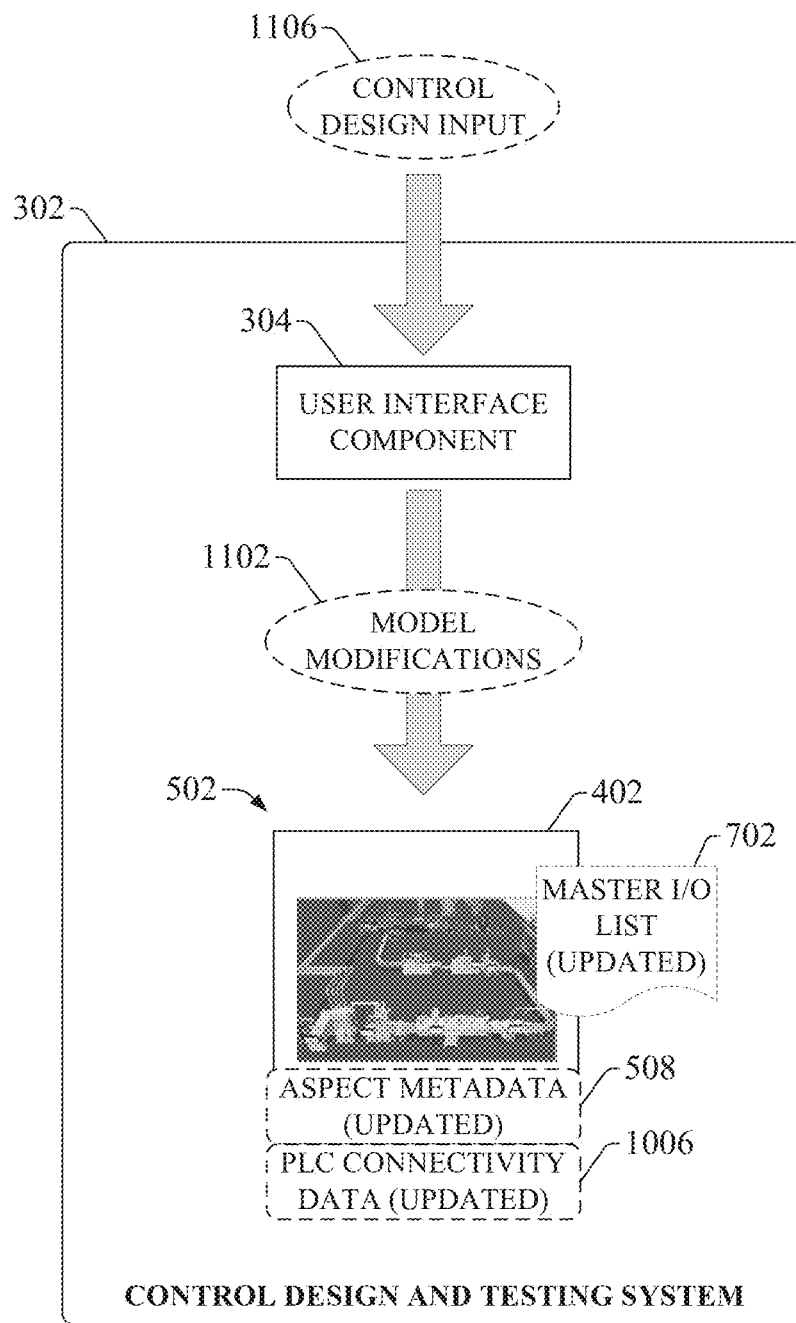
FIG. 11 is a diagram illustrating submission of control design updates to a control design and testing platform.

In the illustrated example, the control design and testing system 302 can allow the user to add to or modify aspects of the control design. This can include implementing and testing modifications to the control program 1008 based on observed results of the simulation. Some control design modifications submitted via the control design and testing system 302 may also be directed to the enhanced digital model 502. FIG. 11 is a diagram illustrating submission of control design updates to the control design and testing system 302. During the process of testing and debugging, a controls engineer may submit control design input 1106 via the testing platform's user interface component 304. This control design input 1106 may comprise additions or modifications to the control program 1008 being tested against the enhanced digital model 502, modifications to the I/O mapping between the model 502 and the control program 1008, updates to the master I/O list 702 to add new I/O points or remove unnecessary I/O points, or other such modifications, some of which may affect the enhanced digital model 502 or its associated metadata 508.

In some embodiments, the control design and testing system 302 can also comprise an aspect metadata component 310 (see FIG. 3) that supports addition or modification of aspect metadata 508 in a manner similar to the CAD-side aspect metadata component 310. The workflow for adding or modifying aspect metadata 508 to the model 502 in the control design and testing system 302 can be similar to that used to add or modify aspect metadata 508 on the CAD side. That is, the interface display (e.g., visualization 1014) rendered by the user interface component 340 may include an aspect toolbar similar to toolbar 604 illustrated in FIG. 6, which can be used to add new aspect metadata to the model 502. User-defined aspect metadata values for a given mechanical element can also be modified by selecting the mechanical element on the graphical representation of the model 502 to invoke the user-defined aspect metadata fields for that element, allowing the user to modify any of the available user-defined values (including those that may have been added and set in the CAD system 202).

To facilitate synchronization between the mechanical engineering and controls engineering efforts, some embodiments of CAD system 202 and control design and testing system 302 can support round-tripping of engineering data between the two systems. According to this round-tripping approach, mechanical design information and associated control aspects can be marked up on the CAD system 202 as discussed above, and the resulting simulation-capable model 502 can be exported to the control design and testing system 302. Within this control and testing system 302, the enhanced digital model 502—the mechanical model 402 enhanced with aspect metadata 508 and further augmented with PLC connectivity data 1006 and a master I/O list 702—can be simulated using the control program 1008 being tested. During testing and debugging, the controls engineer may submit control design input 1106 that necessitates modifications 1102 to the enhanced digital model 502, its associate aspect metadata 508, the PLC connectivity data 1006, or the master I/O list 702, which had been initially developed on the CAD system 202.

Figure 12:
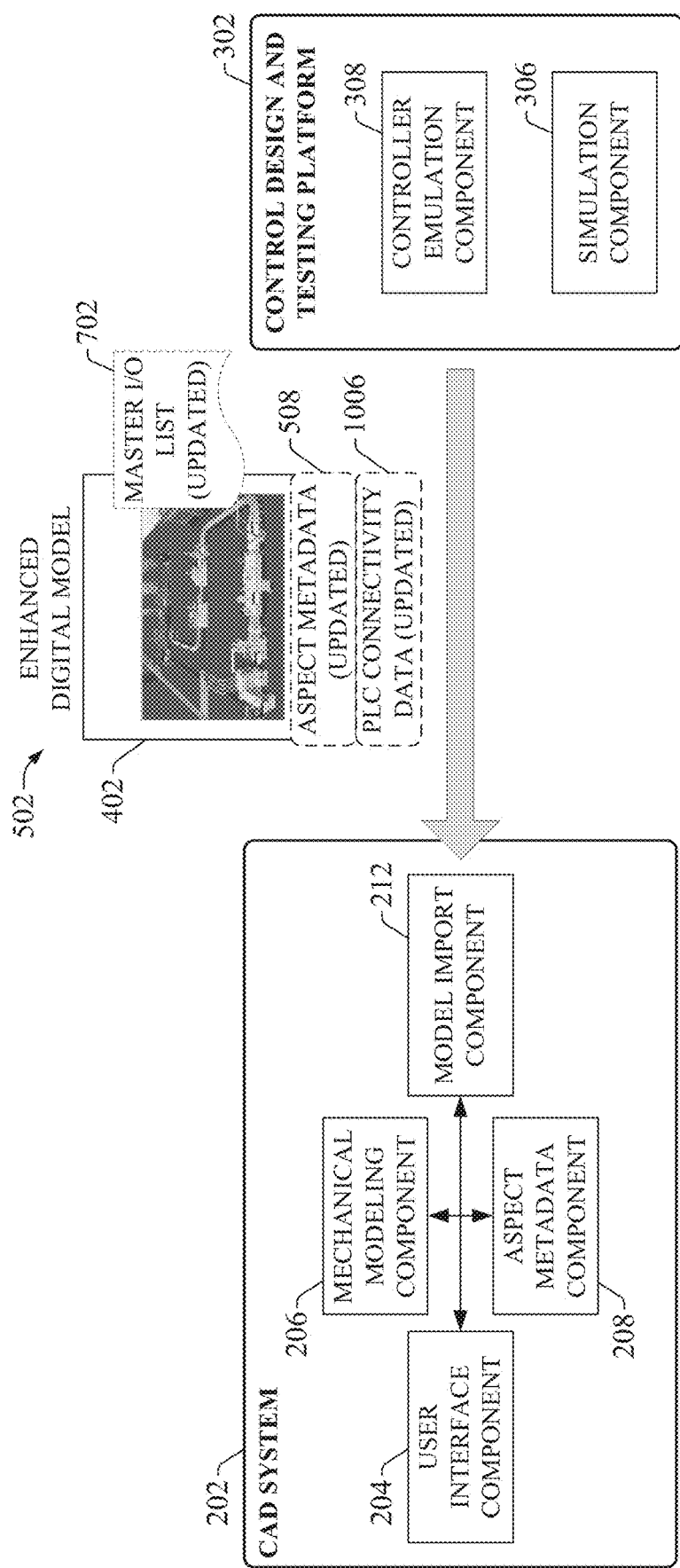
FIG. 12 is a diagram illustrating importing of an updated digital model into a CAD system from a control design and testing platform.

After these modifications have been implemented on the control testing side, the updated model 502—including any modifications made to the aspect metadata 508, PLC connectivity data 1006, or master I/O list 702—can be imported back into the CAD system 202 by the CAD system's model import component 212, as illustrated in FIG. 12. In one or more embodiments, a user of CAD system 202 can import the updated model 502 by selecting an import tool made available on the CAD system's interface display by user interface component 204. After the modified model 502 has been imported, the CAD system 202 detects the changes or additions that were made by the controls engineer on the control design and testing system 302, including the PLC connectivity data 1106, updates to the aspect metadata 508, and updates to the master I/O list 702. Thus, design input submitted by mechanical and controls engineers via their respective development platforms is easily shared between the two engineering groups. This round-tripping of design information ensures that the mechanical and control design data remain synchronized, allowing continuous iteration of the machine design and the control system design that controls these mechanical aspects. This improved design workflow facilitates bidirectional synchronization between engineering work done on the simulation/control side and engineering work done on the CAD/mechanical side, with CAD being the focus of the two engineering threads.

In some embodiments, changes made to the model 502 can be version controlled by the CAD system 202. For example, the CAD system 202 may include a tool that documents changes that were made to the model 402 and reasons why the changes were made (as submitted by the user). Similar version control features may also be supported by the control design and testing system 302.

By integrating the ability to add aspect metadata to a mechanical model within the CAD system itself, embodiments of the present disclosure can provide engineers with tools to quickly and easily generate a dynamic digital twin of an automation system being designed without the need to separately develop a simulation-ready model from scratch. Since the aspect metadata tools can be added to existing CAD systems as a modular add-on in some embodiments, the process of labeling a mechanical model with aspect metadata to yield a digital twin can be intuitively integrated into an existing mechanical design workflow. Moreover, by supporting round-tripping of design data between the mechanical and controls engineering platforms, embodiments of this disclosure can facilitate synchronization between the two engineering threads, with the enhanced CAD model serving as a common source of up-to-date design information across both engineering disciplines.

Figure 13:
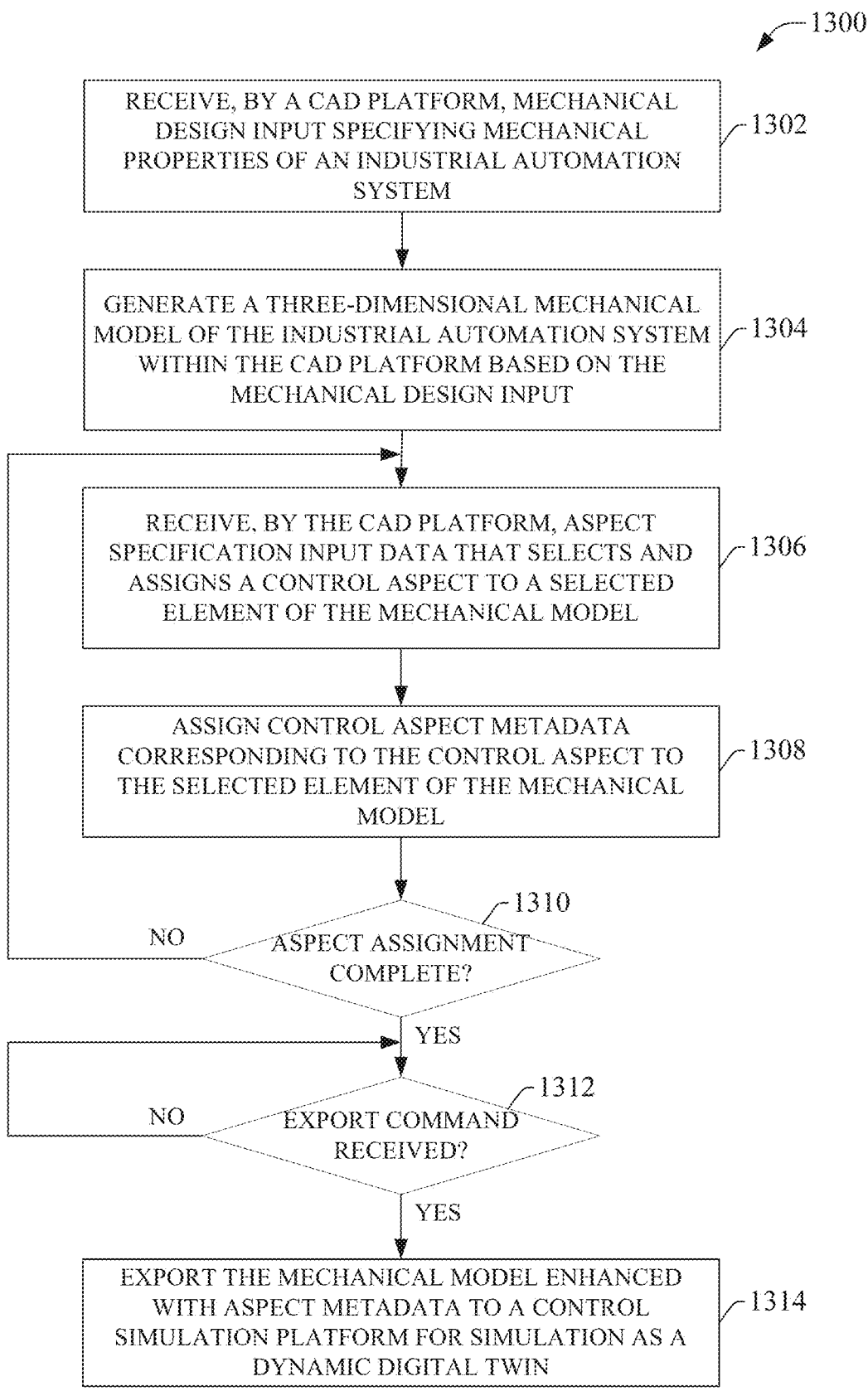
FIG. 13 is a flowchart of an example methodology for developing a mechanical CAD model of an industrial automation system and configuring the model to serve as a dynamic digital twin for execution within a simulation platform.
Figure 14:
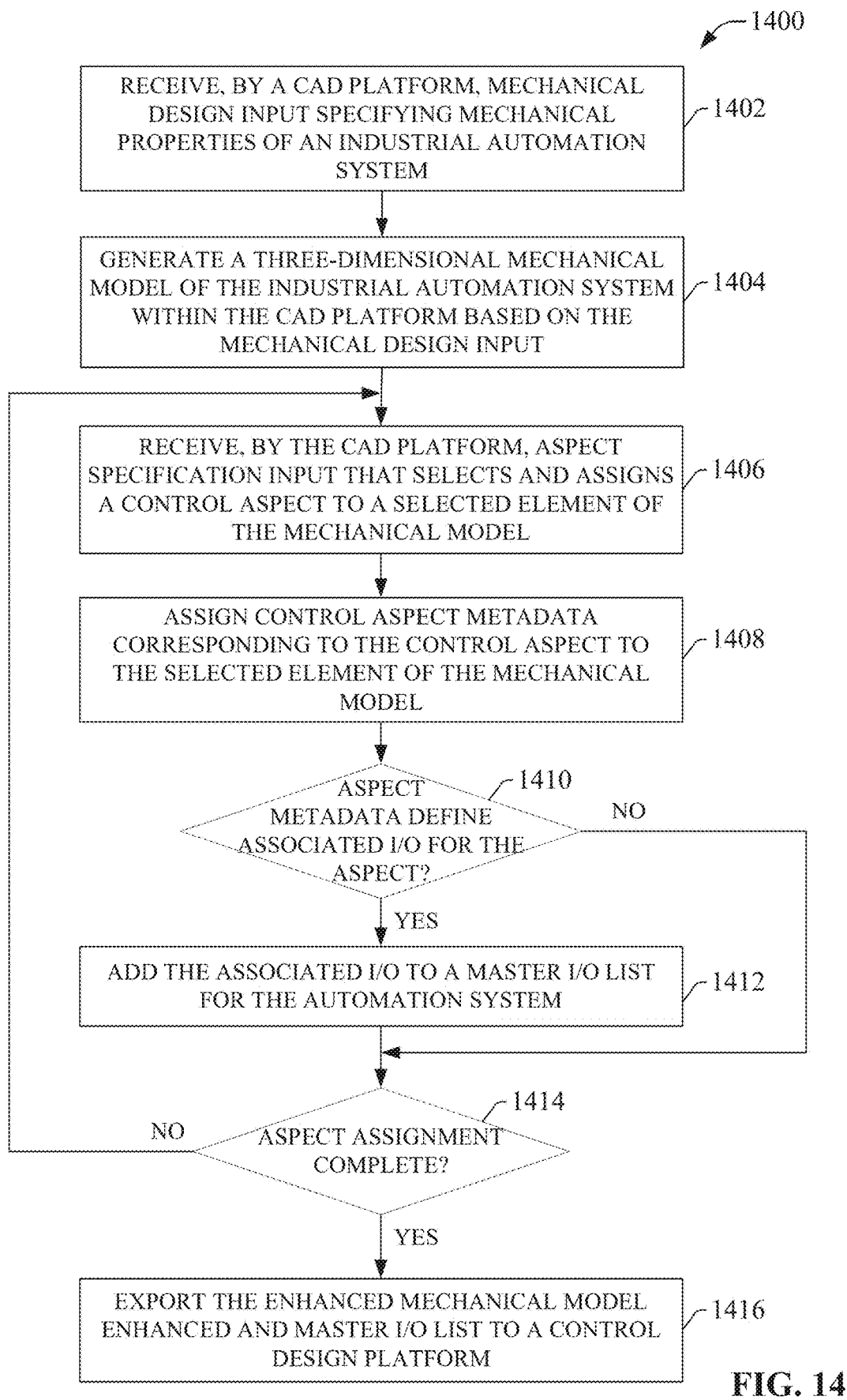
FIG. 14 is a flowchart of an example methodology for generating a dynamic digital twin and associated master I/O list for an automation system in parallel with the mechanical design of the system.

FIGS. 13-14 illustrates various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for developing a mechanical CAD model of an industrial automation system and configuring the model to serve as a dynamic digital twin for execution within a simulation platform. Initially, at 1302, mechanical design input is received by a CAD platform. In an example implementation, the mechanical design input—submitted via interaction with the CAD platform's graphical development interface—specifies mechanical properties of the automation system in terms of three-dimensional shapes representing mechanical structures, machines, or devices to be included in the mechanical design. Collectively, the mechanical design input can define the automation system as a mechanical assembly comprising such industrial assets as industrial robots, conveyors, tooling machines, motors, motor drives, sensors, piping, conduit, platforms, safety gates and fences, control cabinets, or other such assets. The mechanical design input also defines the relative locations, orientations, and physical relationships between these assets. At 1304, a three-dimensional mechanical model of the industrial automation system is generated by the CAD platform based on the mechanical design input received at step 1302.

At 1306, aspect specification input data is received by the CAD platform (via interaction with the CAD platform's graphical development interface). The aspect specification input data assigns a control aspect to a selected element of the mechanical model generated at step 1304. The control aspect can be selected from a list of available aspects rendered in a toolbar or ribbon of the CAD platform's graphical development interface. These aspect definitions can be classified according to types of mechanical elements, control elements, or industrial devices to which the aspects relate. Each aspect defines a set of simulation properties—e.g., physical or kinematic properties or behaviors, physics geometries, motion constraints, etc.—for its associated type of mechanical or control element that can be recognized and leveraged by a simulation platform to determine how that element moves or behaves within a simulation environment. Example aspects that can be selected and applied to the mechanical model include, but are not limited to, various types of dynamic or kinematic joints (e.g., slider joints, revolute joints, robot arm joints, hinges, etc.), movement surfaces such as conveyors, motors, grippers (e.g., suction grippers, mechanical grippers, etc.), sensors, pneumatic or hydraulic actuators (e.g., pusher arms, stoppers, etc.), rollers, or other such elements of the mechanical system.

At 1308, control aspect metadata corresponding to the control aspect selected at step 1306 is assigned to the selected element of the mechanical model (also selected at step 1306). At 1310, a determination is made as to whether assignment of aspects to selected elements of the mechanical model is complete. If additional aspects are to be assigned to the model (NO at step 1310), the methodology returns to step 1306, and steps 1306 and 1308 are repeated such that another element of the mechanical model is labeled with a selected aspect. Alternatively, if assignment of aspects to the mechanical model is complete (YES at step 1310), the methodology proceeds to step 1312, where a determination is made as to whether an export command is received by the CAD system. If the export command is received (YES at step 1312), the methodology proceeds to step 1314, where the mechanical model—enhanced with the aspect metadata applied by iterations of steps 1306 and 1308—is exported to a control simulation platform for simulation as a dynamic digital twin of the automation system. The aspect metadata applied by the CAD system instructs the simulation platform as to how the various components or elements of the mechanical model behave within a simulation context in response to emulated control by a control program being tested.

FIG. 14 illustrates an example methodology 1400 for generating a dynamic digital twin and associated master I/O list for an automation system in parallel with the mechanical design of the system. Initially, at 1402, mechanical design input is received by a CAD platform. The mechanical design input specified mechanical properties of the industrial automation system being designed. At 1404, a three-dimensional mechanical model of the industrial automation system is generated within the CAD platform based on the mechanical design input received at step 1402. At 1406, aspect specification input is received by the CAD platform. The aspect specification input selects and assigns a control aspect to a selected element of the mechanical model. In general, steps 1402-1408 are similar to steps 1302-1308 of methodology 1300.

At 1401, a determination is made as to whether the aspect metadata assigned to the selected element of the mechanical model at step 1408 defines associated I/O for the aspect. In this regard, if the aspect assigned to the model element defines characteristics of an industrial asset that is typically interfaced with an industrial controller via one or more digital or analog inputs or outputs, these inputs or outputs may be defined by the aspect metadata. If the aspect metadata defines associated I/O (YES at step 1410), the methodology proceeds to step 1412, where the associated I/O defined by the aspect metadata is added to a cumulative master I/O list for the automation system. This master I/O list records the total I/O required to interface the automation system with an industrial controller to facilitate monitoring and control of the system. If the aspect metadata does not define associated I/O (NO at step 1410)—that is, the selected aspect corresponds to an element of the automation system that does not typically interface with an industrial controller—the methodology proceeds to step 1414 without updating the master I/O list at 1412.

At 1414, a determination is made as to whether assignment of aspects to the mechanical model is complete. If further aspects are to be assigned to the model (NO at step 1414), the methodology returns to step 1406, and steps 1406-1412 are repeated for another element of the mechanical model. Alternatively, if assignment of aspects is complete (YES at step 1414), the methodology proceeds to step 1416, where the enhanced mechanical model (with associated aspect metadata) and the master I/O list are exported to a control design platform. The master I/O list can be referenced by a controls engineer to aid in the design of the electrical and control system for the automation system.

The amount of memory and processing resources required to execute an industrial simulation varies depending on the size or complexity of the simulation. In the case of large-scale simulations, a single hardware machine may not have sufficient resources to execute the entire simulation without at least sacrificing simulation speed, and in some cases may not be capable of executing the simulation under any circumstances given limitations on local processing power.

To address this, some embodiments of design and testing simulation system 302 can be configured to scale the digital model 502 across multiple different processing nodes. For example, the system 302 can allow the user to designate different portions of the model 502 to be executed on respective different distributed processing nodes, such that each portion of the model 502 is executed on its designated node, and the nodes exchange data as necessary to simulate the aggregate automation system as a whole. In order to visualize this aggregated simulation, the design and testing system 302 can unify the distributed portions of the model 502 into a unified 3D presentation at a single node (e.g., the system 302), and animate this unified view based on graphical and simulation data received from the nodes on which the distributed simulation is executed.

Figure 15:
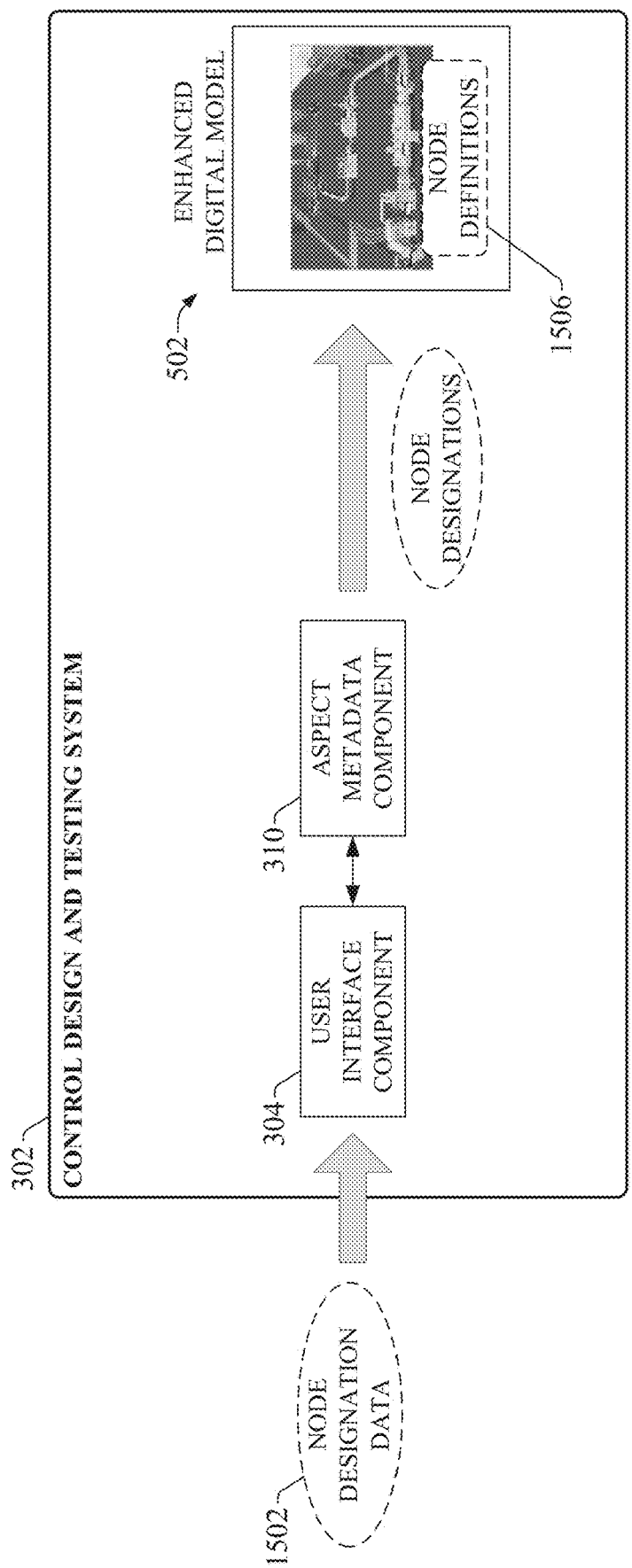
FIG. 15 is a diagram illustrating designation of respective portions of a digital model of an industrial automation system to respective processing nodes.

FIG. 15 is a diagram illustrating designation of respective portions of the digital model 502 to respective processing nodes. Although the examples described herein assume that the model being scaled for distributed simulation is the digital model 502 created through application of aspect metadata as described above, the techniques described herein for scaling an industrial simulation across multiple nodes and generating a unified presentation of the distributed simulation at a single node can be applied to substantially any type of virtualized industrial automation system or plant regardless of the means by which the virtualized system was created.

As shown in FIG. 15, a user can submit node designation data 1502 via the user interface component 304. This node designation data 1502 identifies portions of the digital model 502 that are to be executed on respective different processing nodes. That is, the node designation data 1502 defines a division of the digital model 502 into portions that are to be executed separately on different hardware machines or processing nodes. In some embodiments, in addition to defining the division of the model 502 into portions that are to be executed separately, the node designation data 1502 may also identify, for each defined portion of the digital model 502, the target node on which that defined portion is to be executed. Alternatively, the node designation data 1502 may only define the division of the digital model 502 into portions, and the model deployment component 314 can select, from among available processing nodes, the target nodes on which the respective defined portions of the model 502 will be executed.

The node designations can be defined using any suitable definition criterion. For example, the user may identify, via interaction with a graphical representation of the digital model 502 rendered on a client device, machines or production areas that are to be simulated on respective different processing nodes.

In some embodiments, the node designations defined by the node designation data 1502 can be stored with the model 502 as node definitions 1506, which can subsequently be referenced by the model deployment component 314 to determine how the digital model 502 should be deployed for distributed simulation.

Figure 16:
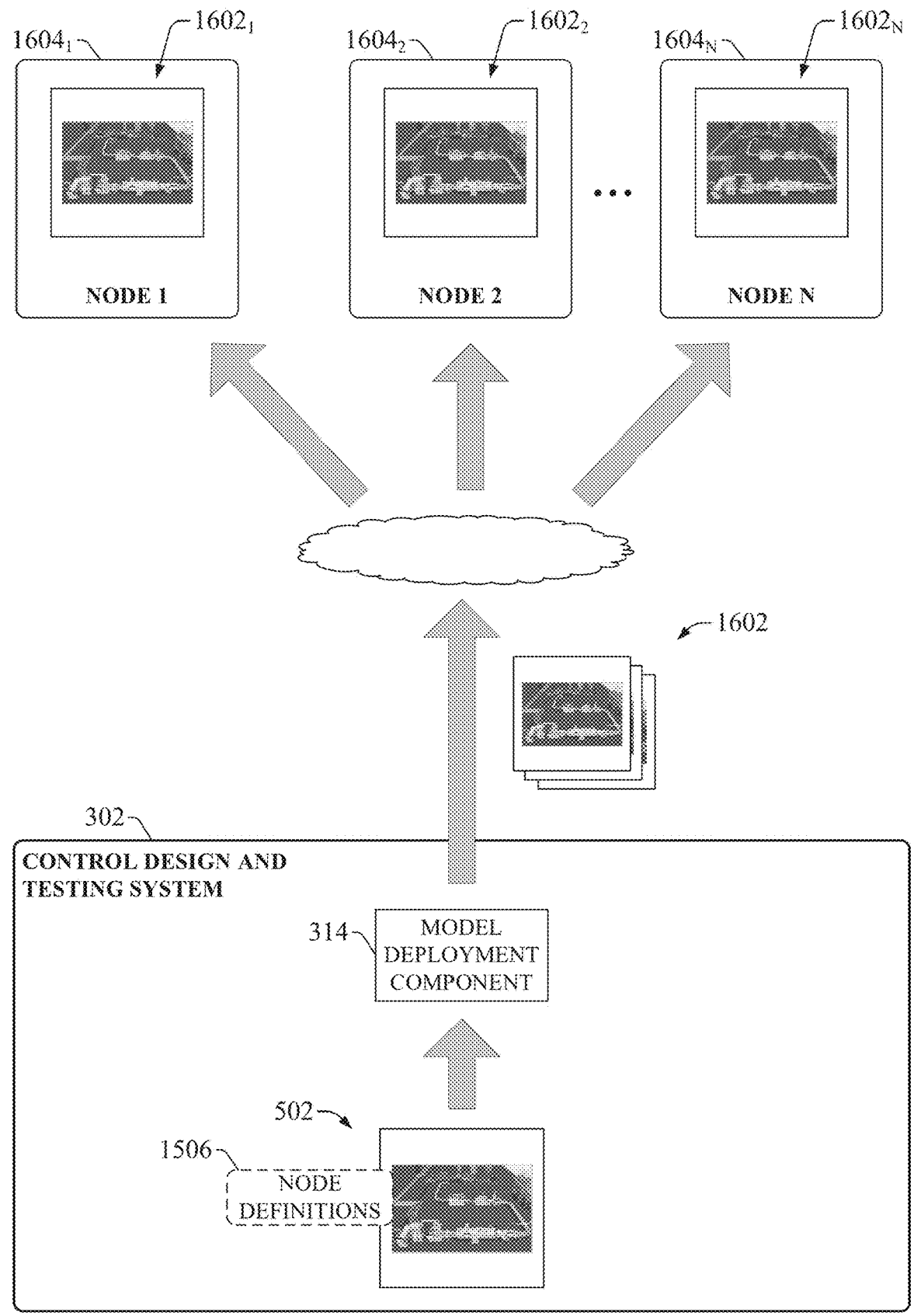
FIG. 16 is a diagram illustrating scaling of a digital model of an industrial automation system across different processing nodes for distributed simulation

FIG. 16 is a diagram illustrating scaling of the digital model 502 across different processing nodes for distributed simulation. Nodes $1604_1$-$1604_N$ represent different hardware machines or processing nodes on which the different portions of the digital model 502 can execute to facilitate distributed simulation of the modeled automation system (where N is a non-zero integer greater than 1). In some scenarios, nodes $1604_1$-$1604_N$ may be different hardware platforms that are networked together to facilitate data exchange between the nodes. Alternatively, nodes $1604_1$-$1604_N$ may be processing nodes that execute on a cloud platform (e.g., as virtual machines). Based on the node definitions 1506 defined by the user, the model deployment component 314 can generate model portions $1602_1$-$1602_N$ comprising respective different portions of the digital model 502 as defined by the node definitions 1506, and deploy these model portions $1602_1$-$1602_N$ to respective nodes $1604_1$-$1604_N$ for distributed execution. The model deployment component 314 can send the model portions $1602_1$-$1602_N$ to their designated nodes $1604_1$-$1604_N$ over a private network (e.g., an office or plant network) and/or a public network (e.g., the internet) via a secure connection.

Figure 17:
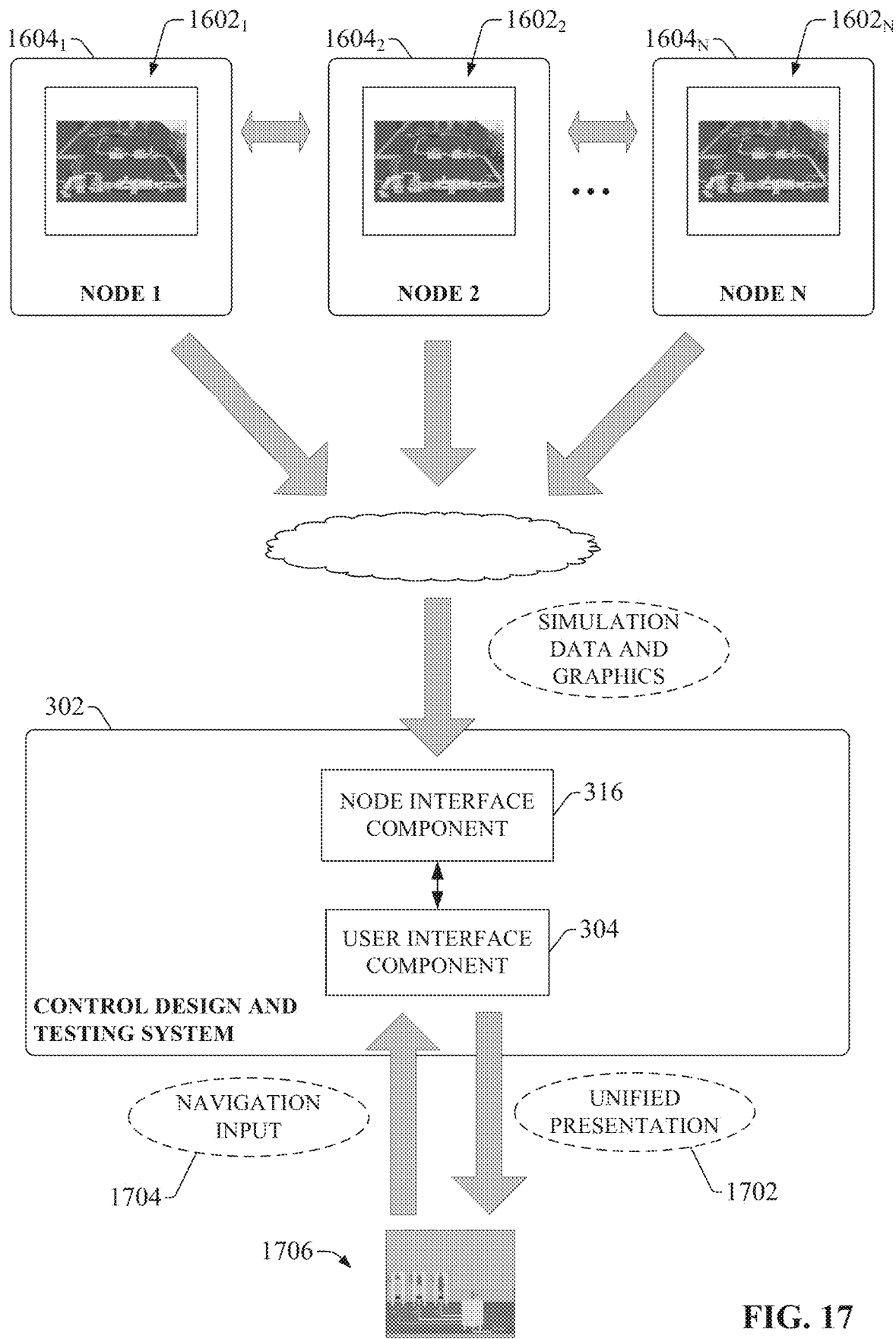
FIG. 17 is a diagram illustrating execution of a distributed simulation and unification of the distributed simulations into a unified 3D view of the simulated system as a whole.

FIG. 17 is a diagram illustrating execution of the distributed simulation and unification of the distributed simulations into a unified 3D view of the simulated system as a whole. The nodes $1604_1$-$1604_N$ are each capable of executing a simulation of its corresponding model portion $1602_1$-$1602_N$ synchronously with execution of the other model portions executing on the other nodes. To facilitate coordinated simulation of the model portions $1602_1$-$1602_N$ as a representation of an aggregate automation system or plant, the processing nodes $1604_1$-$1604_N$ can exchange simulation data as needed, so that simulated actions on a first model portion $1602_1$ that impact simulated operation of a second model portion $1602_2$ are communicated from the node $1604_1$ on which the first model portion $1602_1$ executes to the node $1604_2$ on which the second model portion $1602_2$ executes. In this regard, physical, electrical, or data links between modeled components (e.g., mechanical or electrical components, I/O devices, etc.) defined by the original digital model 502 are maintained when the model portions $1602_1$-$1602_N$ are distributed across the different nodes $1604_1$-$1604_N$.

The distributed simulation can be driven by one or more industrial control programs 1008 (not shown in FIG. 17) executed either by a physical industrial controller or an emulated industrial controller (e.g., a controller emulation component 308 as described above in connection with FIG. 10), such that the processing nodes $1604_1$-$1604_N$ simulate operation of the modeled automation system under control of the industrial control program 1008. In the case of an emulated control program 1008, the program 1008 may be executed by a virtualized industrial controller that executes on one or more of the processing nodes $1604_1$-$1604_N$, or may operate on a separate processing node 1604 that exchanges simulated monitoring and control signals with the other nodes $1604_1$-$1604_N$. In the case of an industrial control program 1008 executed by an actual industrial controller, the controller can be networked to the processing nodes $1604_1$-$1604_N$ to facilitate exchange of simulated response data from the distributed simulation and control signals generated by the industrial controller based on execution of the control program 1008.

The design and testing system 302 can present a unified 3D view of the distributed simulation even though the model portions $1602_1$-$1602_N$ that make up the simulation are distributed across multiple processing nodes $1604_1$-$1604_N$. To this end, the node interface component 316 can unify graphics from the distributed model portions $1602_1$-$1602_N$, and the user interface component 304 can generate unified presentation data 1702 representing an aggregation of these unified graphics. The user interface component 304 renders this unified presentation data 1702 on a client device as an interactive 3D graphical visualization 1706 representing the modeled automation system as a whole, including any appropriate simulation result data (e.g., status indicators, alphanumeric operational information, etc.).

In an example implementation, the node interface component 316 can collect, via the public and/or private network that connects the system 302 to the nodes 1604, simulation data generated by the respective nodes 1604 based on simulation of their respective model portions 1602. Simulation data from a given node 1604 represents behaviors and statuses of the virtualized components represented by the model portion 1602 managed by that node 1604, where these behaviors and statuses are based on the control signals generated by the control program 1008 as well as simulated status and behavior data received from other nodes 1604 based on simulation of their respective model portions 1602. The node interface component 316 also collects graphical data from the respective processing nodes $1604_1$-$1604_N$, where the graphical data from a given node 1604 comprises an animated 3D representation of the model portion 1602 managed by that node 1604. To yield the aggregated view of the composite automation system, the node interface component 316 assembles the graphical data received from all nodes $1604_1$-$1604_N$ to yield an aggregate 3D presentation of the automation system, and animates the resulting unified presentation 1702 in accordance with the simulation data received from the nodes $1604_1$-$1604_N$. This can include animating the movements of the virtualized machines, animating movement of product through the automation system, overlaying simulated status information at appropriate locations within the unified 3D representation, or other such animations. This unified presentation data 1702 is sent to a client device to be rendered as visualization 1706, which is updated in real-time to reflect the current states of the distributed simulation. Visualization 1706 can be similar in format and behavior to visualization 1014 described above.

The unified presentation of the distributed simulation can be navigated via interaction with the visualization 1706. For example, the user can interact with the visualization 1706 to select different viewing angles, zoom distances, or other visualization properties. These interactions are translated into navigation input 1704, which is submitted to the user interface component 304. The node interface component 316 then updates the visualization 1706 in accordance with the input 1704.

In some embodiments, the user can select, via interaction with the visualization 1706, a portion of the virtualized automation system that corresponds to one of the model portions 1602 executing on a node 1604, and in response, the user interface component 304 can update the visualization 1706 to render a detailed view of the model portion 1602 selected by the user, where this detailed view is animated based on data from the particular node 1604 that manages the selected model portion 1602.

Although the architecture depicted in FIG. 17 for aggregating a distributed industrial simulation into a unified presentation has been described herein as unifying a distributed simulation that was generated and deployed as described above in connection with FIGS. 15 and 16, some embodiments of the node interface component 316 can generate unified presentations 1702 of distributed industrial simulations that were created and deployed using other techniques, and are not limited to unification of model portions 1602 that were derived from a digital model 502 enhanced with aspect metadata 508.

The approach described herein for unifying a distributed industrial simulation into an aggregated presentation can allow large industrial simulations to be scaled across multiple processing nodes while still affording a unified view of the virtualized system as a whole. This approach can also facilitate high-fidelity simulations of such automation systems by taking advantage of up-scaled processing resources made possible by distributing the simulation across multiple processing nodes.

Figure 18:
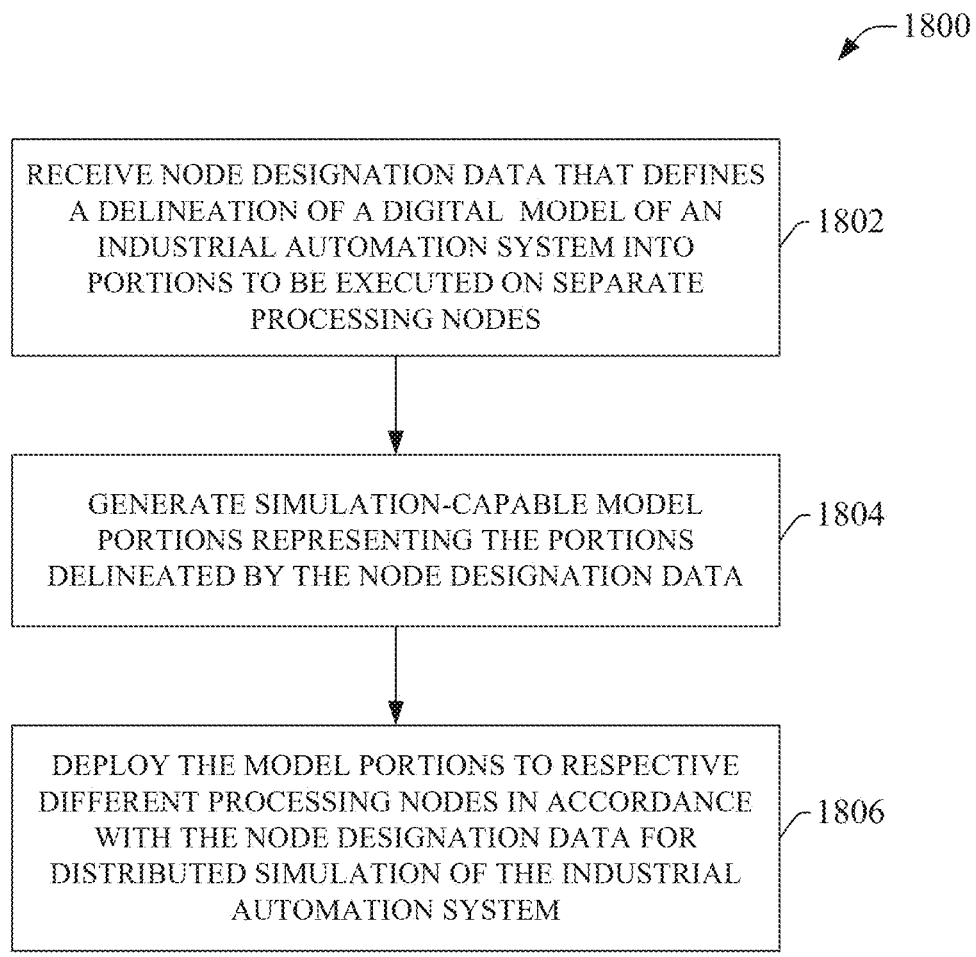
FIG. 18 is a flowchart of an example methodology for scaling a digital model of an industrial automation system across multiple processing nodes for distributed simulation.
Figure 19:
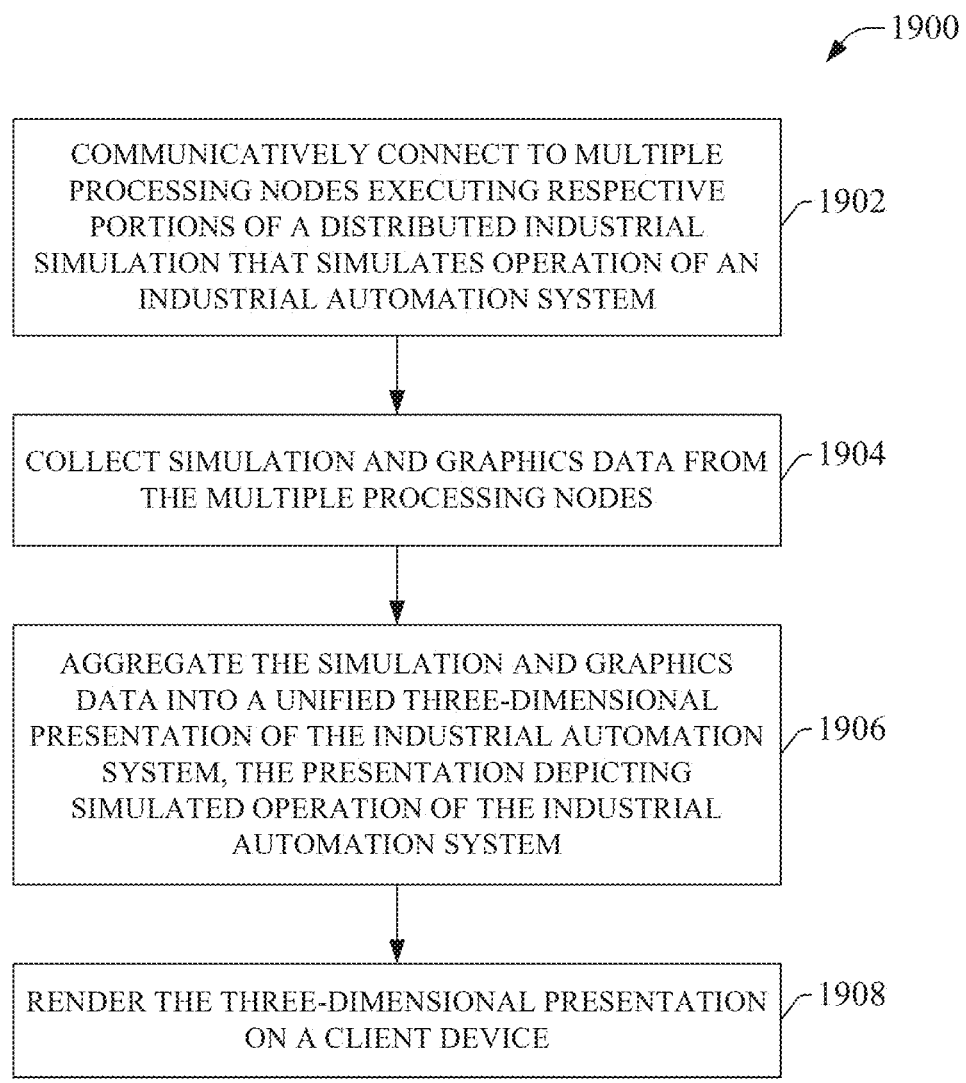
FIG. 19 is a flowchart of an example methodology for aggregating distributed portions of an industrial simulation into a unified presentation.

FIGS. 18-19 illustrates various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 18 illustrates an example methodology 1800 for scaling a digital model of an industrial automation system across multiple processing nodes for distributed simulation. Initially, at 1802, node designation data is received that defines a delineation of a digital model of an industrial automation system into portions to be executed on separate processing nodes. In an example scenario, the node delineation data can specify the portions in terms of sets of equipment, production lines, areas of a plant facility, or other such delineations. At 1804, simulation-capable model portions representing the portions of the industrial automation system delineated by the node designation data are generated. At 1806, the model portions generated at step 1804 are deployed to respective different processing nodes in accordance with the node designation data for distributed simulation of the industrial automation system.

FIG. 19 illustrates an example methodology 1900 for aggregating distributed portions of an industrial simulation into a unified presentation. Initially, at 1902, a system on which the distributed simulation is to be aggregated communicatively connects to multiple processing nodes executing respective portions of a distributed industrial simulation, where the distributed simulation simulates operation of an industrial automation system. At 1904, simulation and graphics data is collected from the multiple processing nodes via the connection established at step 1902. At 1906, the simulation and graphics data collected at step 1904 is aggregated into a unified three-dimensional presentation of the industrial automation system. The unified presentation depicts simulated operation of the industrial automation system. At 1908, the three-dimensional presentation is rendered on a client device.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
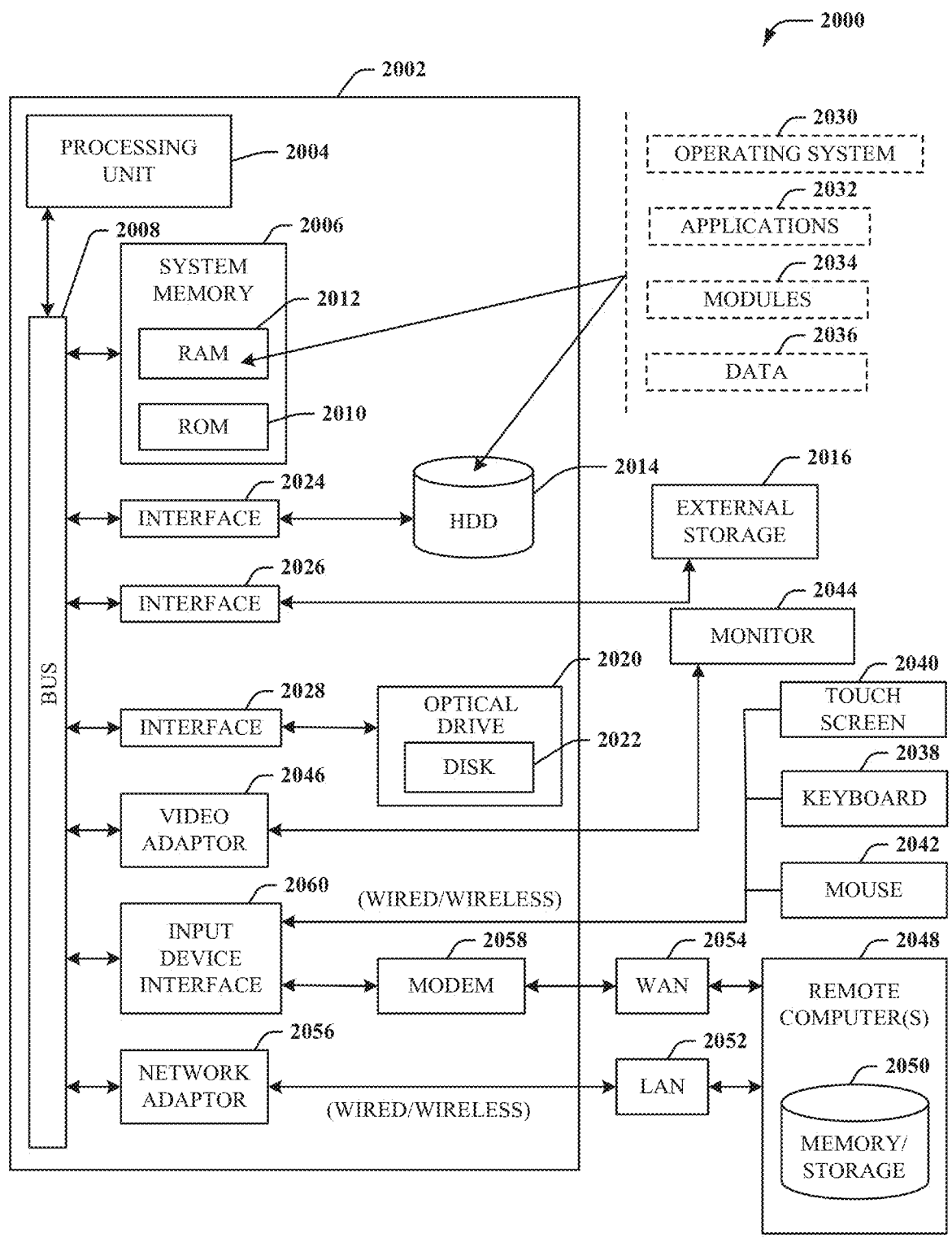
FIG. 20 is an example computing environment.
Figure 21:
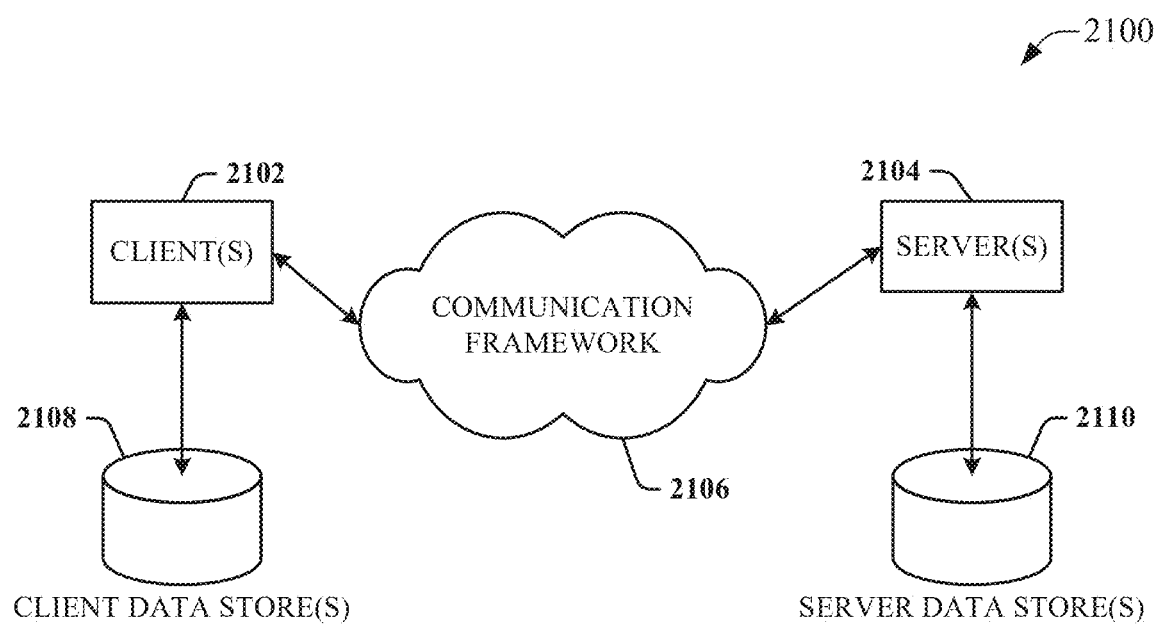
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20, the example environment 2000 for implementing various embodiments of the aspects described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and an optical disk drive 2020 (e.g., which can read or write from a CD-ROM disc, a DVD, a BD, etc.). While the internal HDD 2014 is illustrated as located within the computer 2002, the internal HDD 2014 can also be configured for external use in a suitable chassis (not shown). Additionally, while not shown in environment 2000, a solid state drive (SSD) could be used in addition to, or in place of, an HDD 2014. The HDD 2014, external storage device(s) 2016 and optical disk drive 2020 can be connected to the system bus 2008 by an HDD interface 2024, an external storage interface 2026 and an optical drive interface 2028, respectively. The interface 2024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20 In such an embodiment, operating system 2030 can comprise one virtual machine (VM) of multiple VMs hosted at computer 2002. Furthermore, operating system 2030 can provide runtime environments, such as the Java runtime environment or the .NET framework, for application programs 2032. Runtime environments are consistent execution environments that allow application programs 2032 to run on any operating system that includes the runtime environment. Similarly, operating system 2030 can support containers, and application programs 2032 can be in the form of containers, which are lightweight, standalone, executable packages of software that include, e.g., code, runtime, system tools, system libraries and settings for an application.

Further, computer 2002 can be enable with a security module, such as a trusted processing module (TPM). For instance with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2044 or other type of display device can be also connected to the system bus 2008 via an interface, such as a video adapter 2048. In addition to the monitor 2044, a computer typically includes other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also include a wireless access point (AP) disposed thereon for communicating with the adapter 2056 in a wireless mode.

When used in a WAN networking environment, the computer 2002 can include a modem 2058 or can be connected to a communications server on the WAN 2054 via other means for establishing communications over the WAN 2054, such as by way of the Internet. The modem 2058, which can be internal or external and a wired or wireless device, can be connected to the system bus 2008 via the input device interface 2060. In a networked environment, program modules depicted relative to the computer 2002 or portions thereof, can be stored in the remote memory/storage device 2050. It will be appreciated that the network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2052 or WAN 2054 e.g., by the adapter 2056 or modem 2058, respectively. Upon connecting the computer 2002 to an associated cloud storage system, the external storage interface 2026 can, with the aid of the adapter 2056 and/or modem 2058, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 2104. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for rendering industrial simulations, comprising:
 a memory that stores executable components; and
 a processor, operatively coupled to the memory, that executes the executable components, the executable components comprising:
  a user interface component configured to receive, via interaction with a graphical representation of a digital model of an industrial automation system, node designation data that identifies portions of the digital model that are to be executed on respective different processing node devices;
  a model deployment component configured to generate multiple model portions corresponding to the portions of the digital model based on the node designation data and to deploy the multiple model portions to the respective different processing node devices; and
  a node interface component configured to communicatively connect to the processing node devices, wherein
   the processing node devices respectively execute the multiple model portions to yield a distributed simulation of the industrial automation system,
   the node interface component is further configured to collect graphical data and simulation data from the processing node devices and to aggregate the graphical data and simulation data to yield unified presentation data, and
   the user interface component is further configured to render, on a client device, a unified presentation of the industrial automation system based on the unified presentation data.

2. The system of claim 1, wherein the processing node devices comprise hardware machines that reside on a common network or virtual machines that execute on a cloud platform.

3. The system of claim 1, wherein the user interface component is further configured to, in response to receipt, via interaction with the unified presentation, of navigation input data that defines a navigation through the unified presentation, update the unified presentation in accordance with the navigation input.

4. The system of claim 3, wherein
 the navigation input comprises a selection of an area of the automation system corresponding to a model portion, of the model portions, simulated on a processing node device of the processing node devices, and the user interface component is configured to transition the unified presentation to a detail view of the area of the industrial automation system based on a subset of the simulation data and graphical data received from the processing node device.

5. The system of claim 1, wherein the unified presentation is a three-dimensional graphical representation of the industrial automation system that is animated in accordance with the simulation data received from the processing node devices.

6. The system of claim 1, wherein the executable components further comprise an aspect metadata component configured to associate the node designation data with the digital model.

7. The system of claim 1, wherein the node designation data further defines, for each portion of the digital model, an identity of a processing node device, of the processing node devices, to which the portion is to be deployed.

8. The system of claim 1, wherein
the user interface component is further configured to receive aspect specification input data that labels selected elements of a three-dimensional (3D) mechanical model as being specified aspects of the industrial automation system, and
the aspect metadata component is further configured to assign aspect metadata to the selected elements in accordance with the aspect specification input data, the aspect metadata defining simulation behaviors of the selected elements to yield the digital model of the industrial automation system.

9. A method for generating presentations of industrial simulations, comprising:
receiving, by a system comprising a processor, node designation data via interaction with a graphical representation of a digital model of an industrial automation system, wherein the node designation data identifies portions of the digital model to be executed on respective different processing node devices;
generating, by the system, model portions representing the portions of the digital model based on the division defined by the node designation data;
deploying, by the system, the model portions to the respective different processing node devices;
communicatively connecting, by the system, to the processing node devices, wherein the processing node devices respectively execute the multiple model portions to yield a distributed simulation of the industrial automation system;
collecting, by the system, graphical data and simulation data from the processing node devices;
aggregating, by the system, the graphical data and simulation data to yield unified presentation data; and
rendering, on a client device, a unified presentation of the industrial automation system based on the unified presentation data.

10. The method of claim 9, wherein the processing node devices comprise hardware machines that reside on a common network or virtual machines that execute on a cloud platform.

11. The method of claim 9, further comprising, in response to receiving, via interaction with the unified presentation, navigation input data that defines a navigation through the unified presentation, updating, by the system, the unified presentation in accordance with the navigation input.

12. The method of claim 11, wherein
the receiving of the navigation input data comprises receiving a selection of an area of the industrial automation system corresponding to a model portion, of the model portions, simulated on a processing node device of the processing node devices, and
the updating comprises transitioning the unified presentation to a detail view of the area of the industrial automation system based on a subset of the simulation data and graphical data received from the processing node device.

13. The method of claim 9, wherein the rendering comprises rendering a three-dimensional graphical representation of the industrial automation system and animating the three-dimensional graphical representation in accordance with the simulation data received from the multiple processing node devices.

14. The method of claim 9, further comprising:
associating, by the system, the node designation data with the digital model.

15. The method of claim 9, wherein the node designation data further defines, for each model portion of the model portions, an identity of a processing node device, of the processing node devices, to which the model portion is to be deployed.

16. A non-transitory computer-readable medium having stored thereon instructions that, in response to execution, cause a system comprising a processor to perform operations, the operations comprising:
receiving, via interaction with a graphical representation of a digital model of an industrial automation system, node designation data that specifies portions of the digital model that are to be executed on respective different processing nodes;
generating model portions corresponding to the portions of the digital model based on the division defined by the node designation data;
deploying the model portions to the respective different processing node devices;
communicatively connecting to the processing node devices, wherein the multiple model portions are respectively simulated by the processing node devices to yield a distributed simulation of the industrial automation system;
collecting graphical data and simulation data from the processing node devices;
aggregating the graphical data and simulation data to yield unified presentation data; and
rendering a unified presentation of the industrial automation system based on the unified presentation data.

17. The non-transitory computer-readable medium of claim 16, wherein the processing node devices comprise hardware machines that reside on a common network or virtual machines that execute on a cloud platform.

18. The non-transitory computer-readable medium of claim 16, wherein the rendering comprises rendering a three-dimensional graphical representation of the industrial automation system and animating the three-dimensional graphical representation in accordance with the simulation data received from the multiple processing node devices.

19. The non-transitory computer-readable medium of claim 16, wherein the operations further comprise, in response to receiving, via interaction with the unified presentation, navigation input data that defines a navigation through the unified presentation, updating the unified presentation in accordance with the navigation input.

20. The non-transitory computer-readable medium of claim 19, wherein
- the receiving of the navigation input data comprises receiving a selection of an area of the industrial automation system corresponding to a model portion, of the model portions, simulated on a processing node device of the processing node devices, and
- the updating comprises transitioning the unified presentation to a detail view of the area of the industrial automation system based on a subset of the simulation data and graphical data received from the processing node device.

* * * * *